US010584814B2

(12) United States Patent
Brown et al.

(10) Patent No.: US 10,584,814 B2
(45) Date of Patent: Mar. 10, 2020

(54) CONDUIT FITTING WITH STROKE RESISTING FEATURES

(71) Applicant: Swagelok Company, Solon, OH (US)

(72) Inventors: Cal R. Brown, Lyndhurst, OH (US); Peter C. Williams, Cleveland Heights, OH (US); Gregory S. Kalata, Avon, OH (US); Douglas S. Welch, Chesterland, OH (US); Ronald P. Campbell, Shaker Heights, OH (US)

(73) Assignee: SWAGELOK COMPANY, Solon, OH (US)

( * ) Notice: Subject to any disclaimer, the term of this patent is extended or adjusted under 35 U.S.C. 154(b) by 336 days.

(21) Appl. No.: 15/459,097

(22) Filed: Mar. 15, 2017

(65) Prior Publication Data

US 2017/0276270 A1 Sep. 28, 2017

Related U.S. Application Data

(60) Provisional application No. 62/311,971, filed on Mar. 23, 2016.

(51) Int. Cl.
F16L 19/10 (2006.01)
F16L 19/06 (2006.01)

(52) U.S. Cl.
CPC ............. *F16L 19/061* (2013.01); *F16L 19/10* (2013.01); *F16L 2201/30* (2013.01)

(58) Field of Classification Search
CPC .... F16L 2201/30; F16L 2201/10; F16L 19/10
See application file for complete search history.

(56) References Cited

U.S. PATENT DOCUMENTS 791,905 A 6/1905 Higginbotham
1,058,542 A 4/1913 Brown
(Continued)

FOREIGN PATENT DOCUMENTS

AT 387081 11/1988
BE 556445 11/1988
(Continued)

OTHER PUBLICATIONS

Alprene Poly16 Plus Compression Fittings webpage, May 13, 2016, 1 pg.
(Continued)

*Primary Examiner* — David Bochna
(74) *Attorney, Agent, or Firm* — Calfee, Halter & Griswold LLP

(57) ABSTRACT

A fitting includes first and second fitting components adapted to be joined on a conduit to a first relative axial position to effect a seal between the conduit and a sealing element, sealing the conduit from a non-wetted fitting interior volume at least partially defined by the first and second fitting components. When the first and second fitting components are joined to the first relative axial position, first and second annular surfaces of the fitting axially engage, resulting in resistance to additional axial stroke of the first and second fitting components. At least one of the first and second annular surfaces includes a recess extending from an inner diameter to an outer diameter of the corresponding annular surface, and defining a leak detection port in fluid communication with the fitting interior volume when the first annular surface is in engagement with the second annular surface.

23 Claims, 26 Drawing Sheets

(56) References Cited

U.S. PATENT DOCUMENTS

| | | | |
|---|---|---|---|
| 1,894,700 A | 1/1933 | Parker | |
| 2,284,216 A | 5/1942 | Kunkel | |
| 2,354,538 A | 7/1944 | Parker | |
| 2,399,275 A | 4/1946 | Wenk | |
| 2,420,778 A | 5/1947 | Herold | |
| 2,511,134 A | 6/1950 | Stranberg | |
| 2,904,355 A | 9/1959 | Creamer | |
| 3,039,796 A | 6/1962 | Lawman | |
| 3,120,969 A | 2/1964 | Schmohl | |
| 3,139,293 A | 6/1964 | Franck | |
| 3,195,933 A | 7/1965 | Jacobs | |
| 3,248,136 A | 4/1966 | Brozek | |
| 3,275,350 A | 9/1966 | Kody et al. | |
| 3,287,813 A | 11/1966 | Lennon et al. | |
| 3,441,297 A | 4/1969 | Koski | |
| 3,448,128 A | 5/1969 | Teeters | |
| 3,521,912 A | 7/1970 | Mauerer | |
| 3,584,900 A * | 6/1971 | Lennon | F16L 19/103 285/14 |
| 3,596,933 A | 8/1971 | Luckenbill | |
| 3,684,322 A | 8/1972 | Kotsakis | |
| 3,691,604 A | 9/1972 | Spontelli | |
| 3,695,647 A | 10/1972 | Pugliese | |
| 3,848,905 A | 11/1974 | Hammer et al. | |
| 3,893,716 A | 7/1975 | Moreiras et al. | |
| 3,895,832 A | 7/1975 | Ellis et al. | |
| 4,037,864 A | 7/1977 | Anderson et al. | |
| 4,194,770 A | 3/1980 | Richards | |
| 4,286,807 A | 9/1981 | Bachli | |
| 4,293,149 A | 10/1981 | Bonel | |
| 4,437,691 A | 3/1984 | Laney | |
| 4,438,953 A | 3/1984 | Timme, Jr. | |
| 4,475,748 A | 10/1984 | Ekman | |
| 4,529,231 A | 7/1985 | Greenawalt | |
| 4,538,842 A | 9/1985 | Kowal et al. | |
| 4,568,114 A | 2/1986 | Konrad | |
| 4,586,731 A | 5/1986 | Castrup | |
| 4,690,437 A | 9/1987 | Anderson et al. | |
| 4,799,717 A | 1/1989 | Kingsford | |
| 4,877,271 A | 10/1989 | McCorkle et al. | |
| 4,881,316 A | 11/1989 | Wing | |
| 4,919,455 A | 4/1990 | Yoshiro | |
| 5,074,599 A | 12/1991 | Wirbel et al. | |
| 5,090,738 A | 2/1992 | Rakieski | |
| 5,149,148 A | 9/1992 | Teauber et al. | |
| 5,186,501 A | 2/1993 | Mano | |
| 5,280,967 A | 1/1994 | Varrin, Jr. | |
| 5,351,998 A | 10/1994 | Behrens et al. | |
| 5,388,866 A | 2/1995 | Schlosser | |
| 5,439,259 A | 8/1995 | Taga et al. | |
| 5,536,049 A | 7/1996 | Coules et al. | |
| 5,622,393 A | 4/1997 | Elbich et al. | |
| 5,658,025 A | 8/1997 | Ridenour | |
| 5,796,898 A | 8/1998 | Lee | |
| 5,921,588 A | 7/1999 | Vogel et al. | |
| 6,073,976 A | 6/2000 | Schmidt et al. | |
| 6,089,620 A | 7/2000 | Mota Lopez et al. | |
| 6,109,660 A | 8/2000 | Akiyama et al. | |
| 6,123,364 A | 9/2000 | Inoue et al. | |
| 6,142,535 A * | 11/2000 | Nishio | F16L 19/005 285/331 |
| 6,244,807 B1 | 6/2001 | Garcia | |
| 6,279,242 B1 * | 8/2001 | Williams | F16L 19/00 285/93 |
| 6,334,632 B1 * | 1/2002 | Nishio | F16L 47/04 285/331 |
| 6,640,457 B2 * | 11/2003 | Williams | F16L 19/00 285/93 |
| 6,641,180 B2 | 11/2003 | Udhoefer | |
| 6,688,651 B2 * | 2/2004 | Min-cheol | F16L 19/005 285/92 |
| 6,851,729 B2 | 2/2005 | Gibson | |
| 6,860,514 B2 | 3/2005 | Wentworth et al. | |
| 6,905,142 B2 | 6/2005 | Do | |
| 7,002,077 B2 | 2/2006 | Pyron | |
| 7,032,932 B2 | 4/2006 | Guest | |
| 7,240,925 B2 | 7/2007 | Fukano et al. | |
| 7,416,225 B2 | 8/2008 | Williams et al. | |
| 7,497,483 B2 | 3/2009 | Williams et al. | |
| 7,690,696 B2 | 4/2010 | Mallis et al. | |
| 7,695,027 B2 | 4/2010 | Williams et al. | |
| 8,038,180 B2 | 10/2011 | Williams et al. | |
| 8,292,680 B1 | 10/2012 | Herr et al. | |
| 8,608,210 B2 | 12/2013 | Kainec | |
| 8,641,099 B2 * | 2/2014 | Cuva | F16L 19/005 285/124.4 |
| 8,876,170 B2 | 11/2014 | Williams et al. | |
| 8,931,810 B2 | 1/2015 | Clason | |
| 8,960,728 B2 | 2/2015 | Williams et al. | |
| 9,297,481 B2 | 3/2016 | Williams et al. | |
| 2002/0148128 A1 | 10/2002 | Williams | |
| 2004/0222632 A1 * | 11/2004 | Viegener | F16L 13/143 285/256 |
| 2005/0097763 A1 | 5/2005 | Williams | |
| 2007/0144021 A1 | 6/2007 | Williams et al. | |
| 2009/0102190 A1 * | 4/2009 | Koji | F16L 19/0286 285/335 |
| 2009/0289452 A1 * | 11/2009 | Bennett | F16L 19/065 285/339 |
| 2009/0299514 A1 | 12/2009 | Williams et al. | |
| 2010/0171309 A1 | 7/2010 | Kainec | |
| 2010/0213705 A1 | 8/2010 | Williams et al. | |
| 2012/0005878 A1 | 1/2012 | Rubinski | |
| 2012/0043757 A1 * | 2/2012 | Williams | F16L 19/103 285/339 |
| 2013/0181445 A1 | 7/2013 | Glime et al. | |
| 2015/0323110 A1 | 11/2015 | Trivett et al. | |
| 2016/0091126 A1 * | 3/2016 | Gibson | F16L 19/10 285/382 |

FOREIGN PATENT DOCUMENTS

| | | |
|---|---|---|
| CN | 1213244 C | 3/2005 |
| CN | 101120197 A | 2/2008 |
| DE | 645775 C | 6/1937 |
| DE | 1775542 A1 | 7/1971 |
| DE | 2145760 A1 | 3/1973 |
| DE | 3511056 A1 | 10/1986 |
| DE | 4041679 A1 | 6/1992 |
| DE | 4216707 A1 | 12/1992 |
| DE | 19607784 A1 | 10/1996 |
| DE | 10206684 A1 | 8/2003 |
| DK | 112060 B | 11/1968 |
| EP | 34493 | 8/1981 |
| EP | 118656 A1 | 6/1986 |
| EP | 205170 A2 | 12/1986 |
| EP | 224188 A1 | 6/1987 |
| EP | 309179 A1 | 3/1989 |
| EP | 371063 | 2/1992 |
| EP | 484091 A1 | 5/1992 |
| EP | 285677 | 12/1992 |
| EP | 396367 | 1/1993 |
| EP | 528079 A1 | 2/1993 |
| EP | 531068 A2 | 3/1993 |
| EP | 581408 A1 | 2/1994 |
| EP | 489289 | 5/1994 |
| EP | 638752 A1 | 2/1995 |
| EP | 669473 | 8/1995 |
| EP | 523020 B1 | 2/1996 |
| EP | 583707 | 3/1996 |
| EP | 441676 | 6/1996 |
| EP | 751334 A1 | 1/1997 |
| EP | 762003 A1 | 3/1997 |
| EP | 863354 A1 | 9/1998 |
| EP | 879980 A2 | 11/1998 |
| EP | 895014 A2 | 2/1999 |
| EP | 899498 A2 | 3/1999 |
| EP | 940617 A2 | 9/1999 |
| EP | 1020675 A1 | 7/2000 |
| EP | 1033518 A1 | 9/2000 |
| EP | 1055859 A2 | 11/2000 |
| EP | 1271038 A1 | 1/2003 |

(56) References Cited

FOREIGN PATENT DOCUMENTS

| | | |
|---|---|---|
| EP | 1358418 | 4/2005 |
| EP | 1612467 A2 | 1/2006 |
| EP | 1647752 A1 | 4/2006 |
| EP | 2257715 | 10/2015 |
| FR | 1263685 | 6/1961 |
| FR | 2849493 | 7/2004 |
| GB | 2032555 | 5/1980 |
| GB | 2165899 | 4/1986 |
| JP | 59-187184 | 10/1984 |
| JP | H01-058888 | 4/1989 |
| JP | 7-243564 | 9/1995 |
| JP | 08-014449 | 1/1996 |
| JP | 11201347 | 7/1999 |
| JP | 2001-099337 | 4/2001 |
| JP | 2001-099360 | 4/2001 |
| WO | 84/00796 A1 | 3/1984 |
| WO | 88/04385 A1 | 6/1988 |
| WO | 89/009904 A1 | 10/1989 |
| WO | 89/012190 A1 | 12/1989 |
| WO | 93/24780 A1 | 12/1993 |
| WO | 93/25837 A1 | 12/1993 |
| WO | 94023234 A1 | 10/1994 |
| WO | 97/007356 A1 | 2/1997 |
| WO | 97/14905 A1 | 4/1997 |
| WO | 97/043571 A1 | 11/1997 |
| WO | 98/032999 A1 | 7/1998 |
| WO | 99/24750 A1 | 5/1999 |
| WO | 99/34142 A1 | 7/1999 |
| WO | 01/20214 A1 | 3/2001 |
| WO | 02/063194 A2 | 8/2002 |
| WO | 02/063195 A2 | 8/2002 |
| WO | 04/013527 A2 | 2/2004 |
| WO | 05/019717 A1 | 3/2005 |
| WO | 05/106310 A1 | 11/2005 |
| WO | 07/048021 A2 | 4/2007 |
| WO | 08/057983 A1 | 5/2008 |
| WO | 09/003016 A1 | 12/2008 |
| WO | 09/18079 A1 | 2/2009 |
| WO | 09/20900 A2 | 2/2009 |
| WO | 11/99667 A1 | 8/2011 |

OTHER PUBLICATIONS

Ningbo Big Tree International Trade Co., Ltd., Pneumatic Push on Fitting Two Touch Type webpages, 3 pgs., May 13, 2016.
Alibaba, Brass Ferrule Tube Compression Fittings webpages, 8 pgs., May 13, 2016.
Plumbing Supply.com, Plumbing Related Tools webpages, 36 pages, May 13, 2016.
International Search Report and Written Opinion from PCT/US2017/022402 dated May 31, 2017.
4F1 product drawing, Aug. 19, 2002.
4F0-6GC product drawing, Apr. 26, 2004.
One page drawing dated Apr. 28, 2009—Standard 800 Series Space Collar Assy., (illustrated collar and fitting assembly offered for sale at least as early as Feb. 5, 2000) Swagelok Compan.
Parker Hannifin Corporation, Suparcase, The Invisible Breakthrough, Parker Suparcase Promotion Folder, Parker Hannifin Corporation, Huntsville, AL.
Parker Hannifin Corporation, Parker Suparcase Process Hardens Stainless Steel to Become More Resistant to Corrosion, News Release, Parker Hannifin Corporation, Huntsville, AL.
Parker Hannifin Corporation, Engineering Report—Ferrule Design Suparcase, Parker Suparcase Bulletin, 4230-B15.1, Parker Hannifin Corporation, Huntsville, AL.
Parker Hannifin Corporation, Parker Suparcase, A Proprietary Process for the Hardening of Stainless Steel Ferrules, Parker Suparcase Bulletin, Mar. 1993, 4230-B15.3, Parker Hannifin Corporation, Huntsville, AL.
Two pages, 4300 Catalog, Triple-Lok 37 degrees flared tube fitting, Parker Hannifin, Sep. 2000.
European Search Report from Application No. 12161443.2 dated May 9, 2012.

* cited by examiner

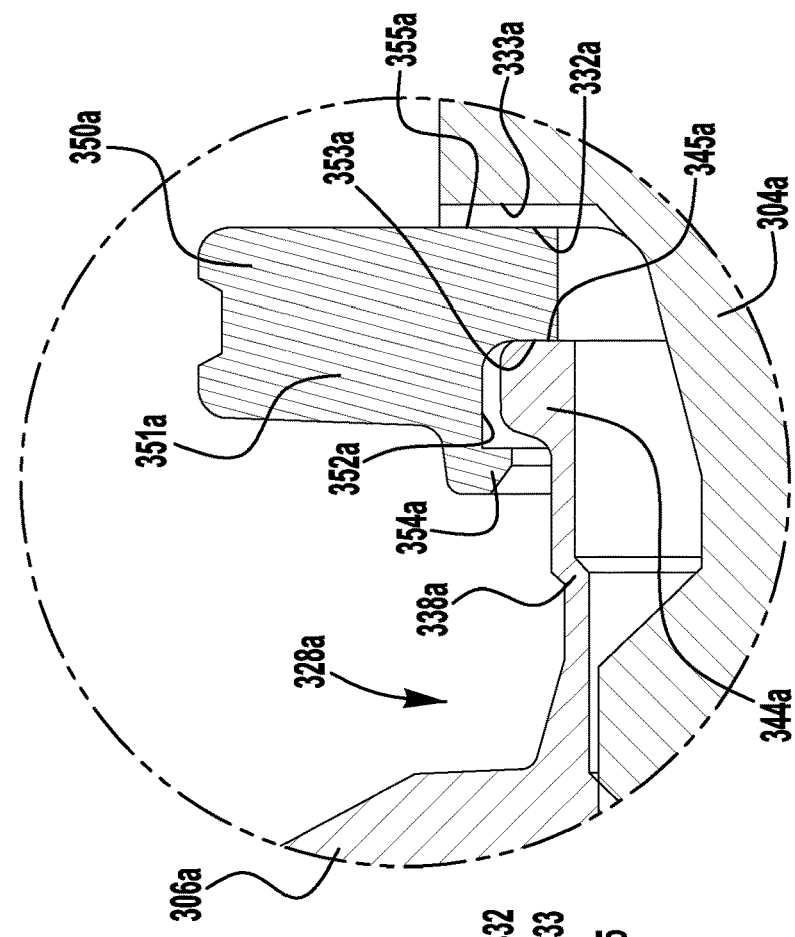
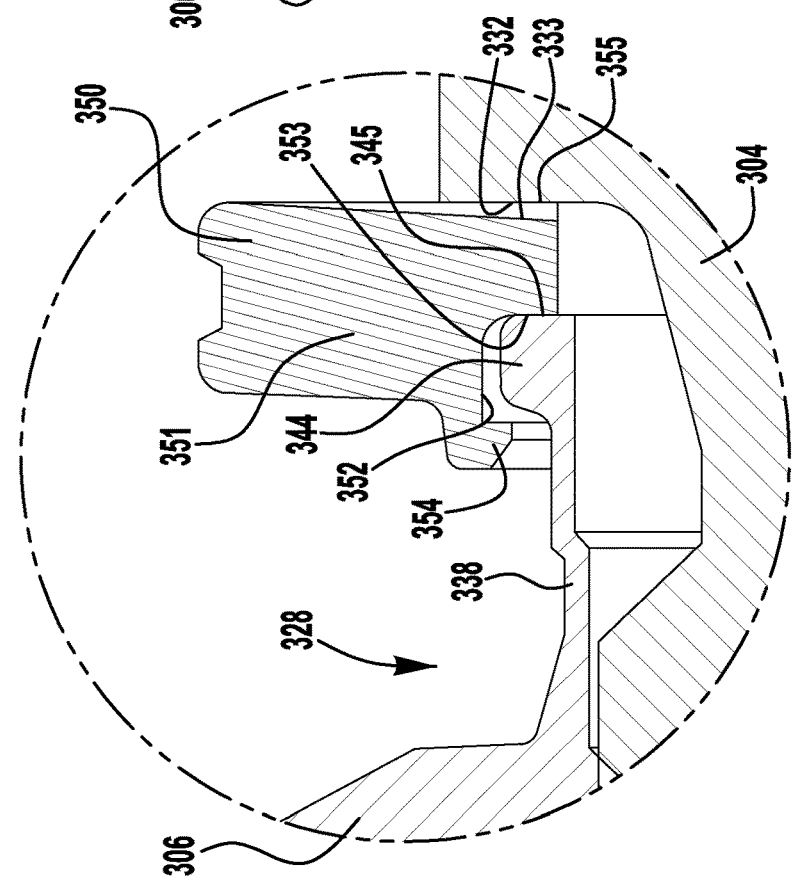

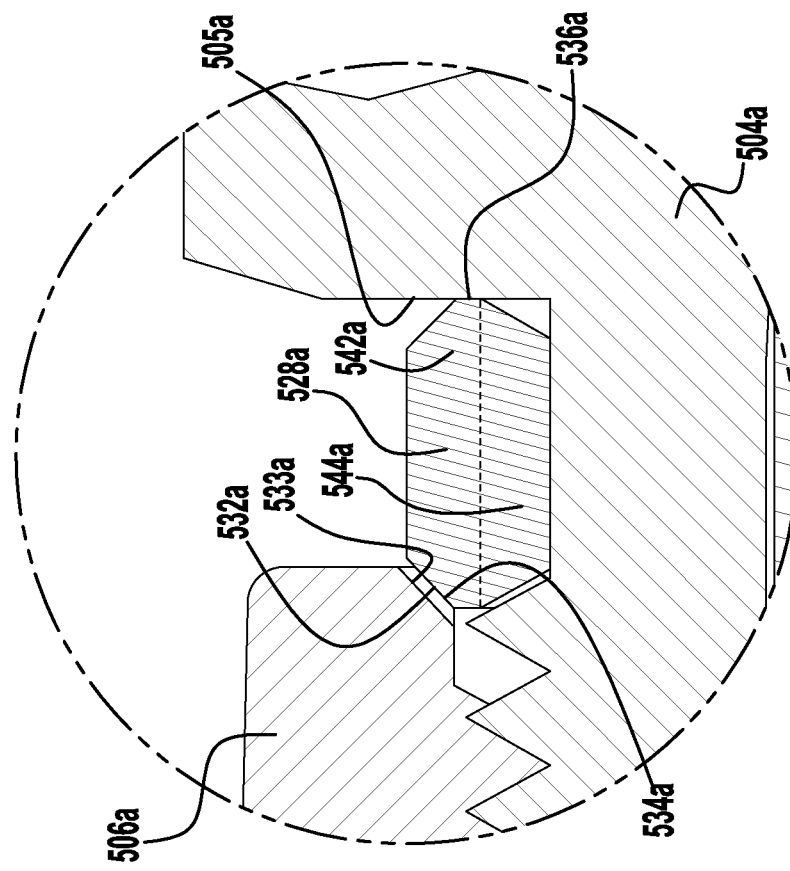
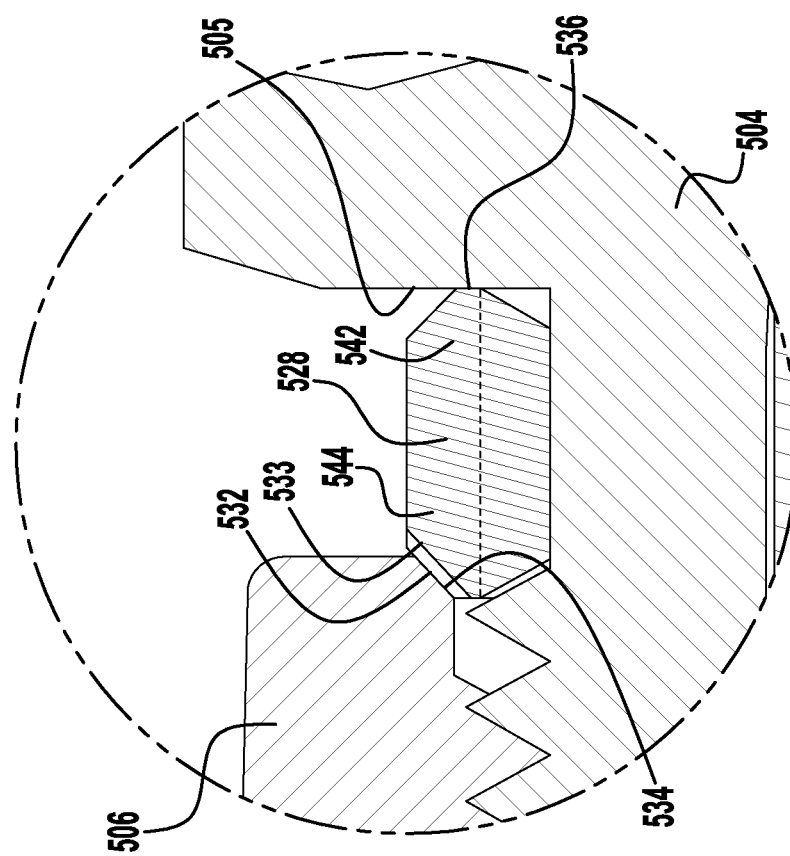

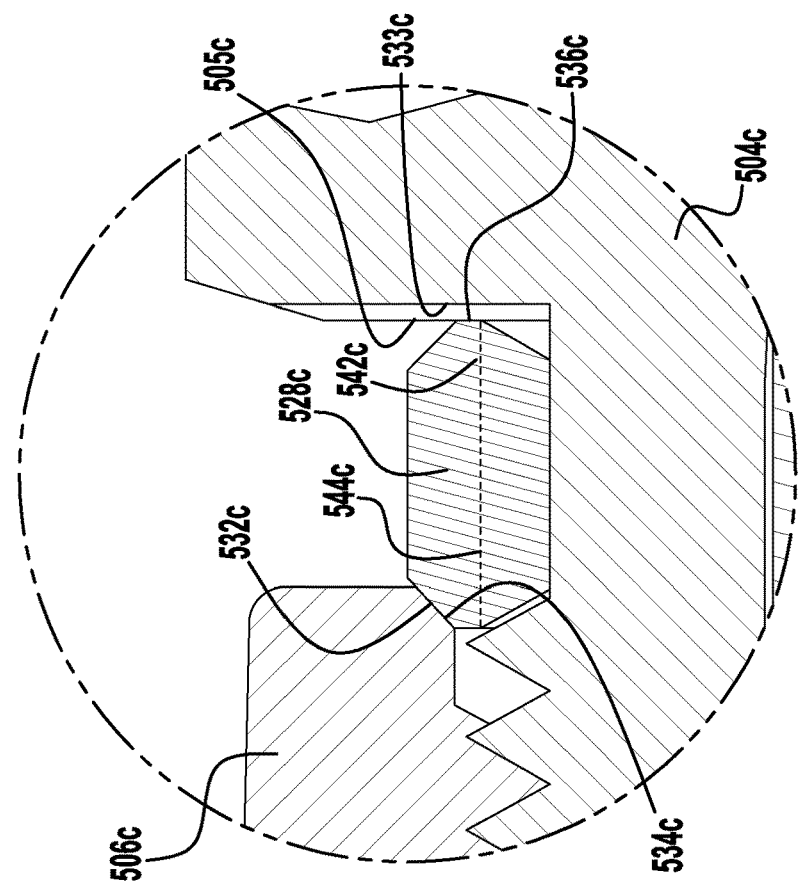
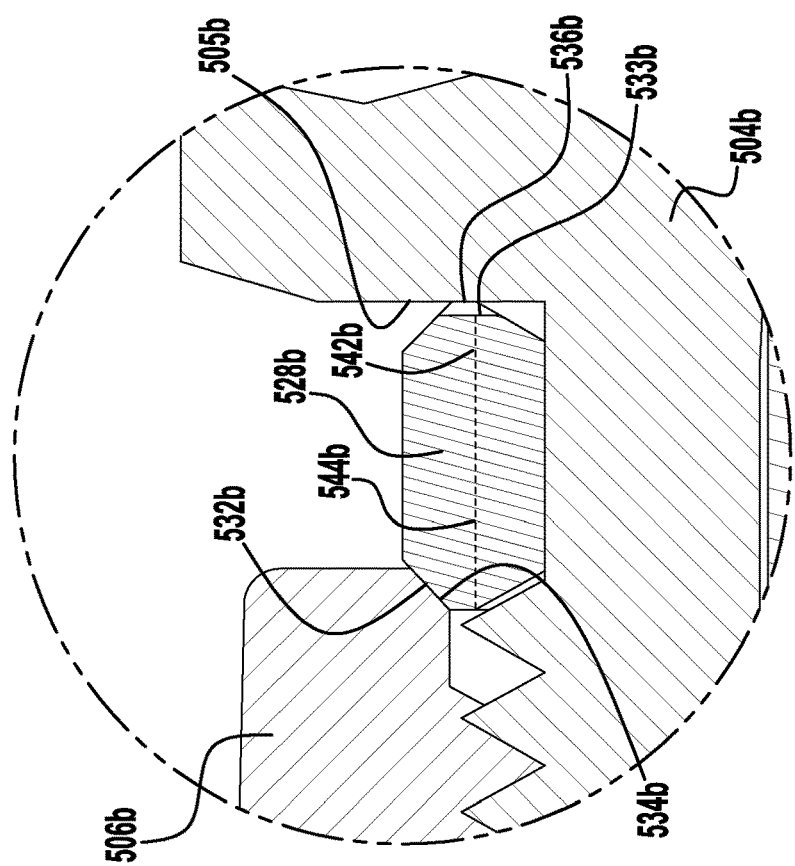

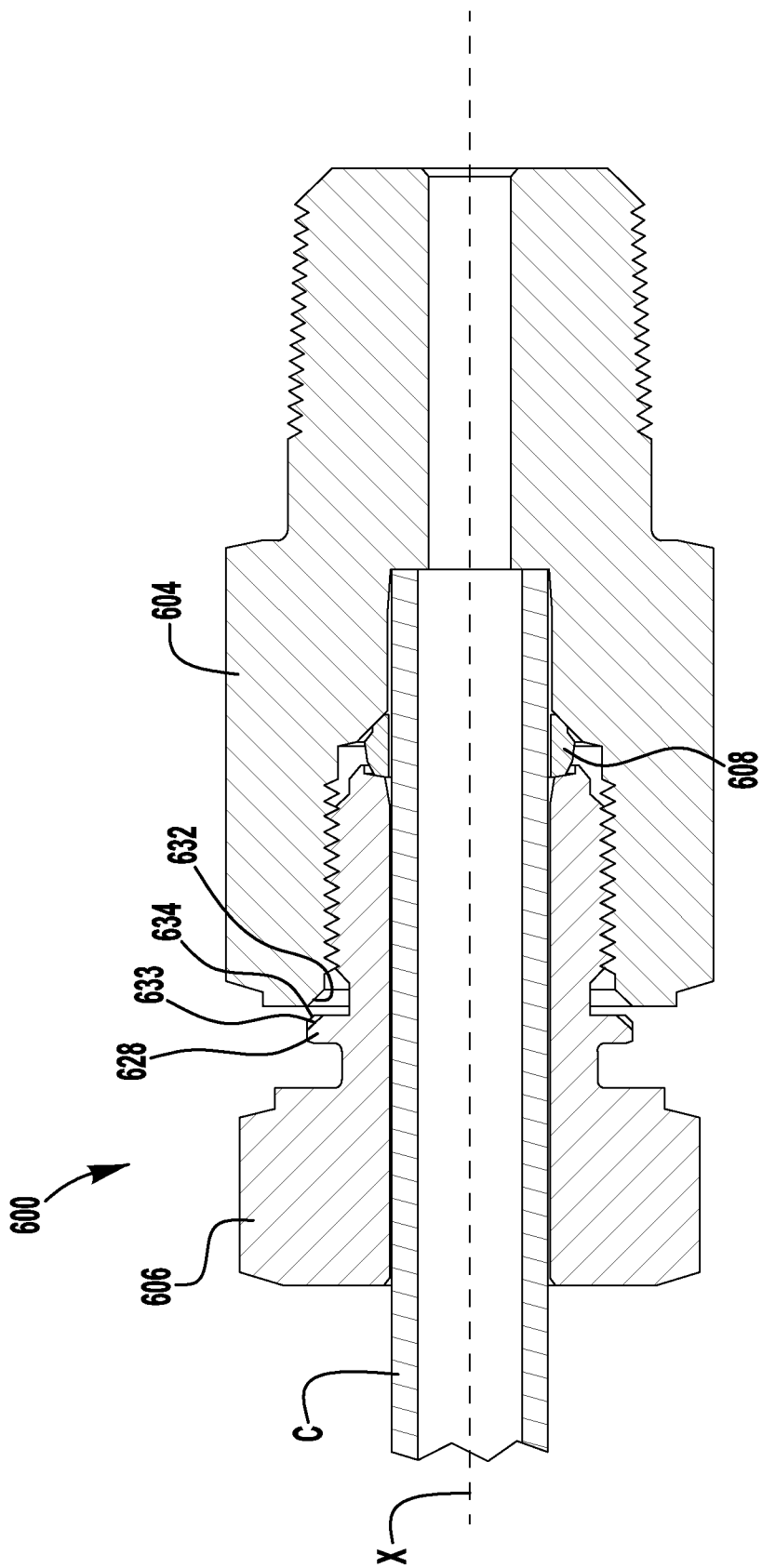

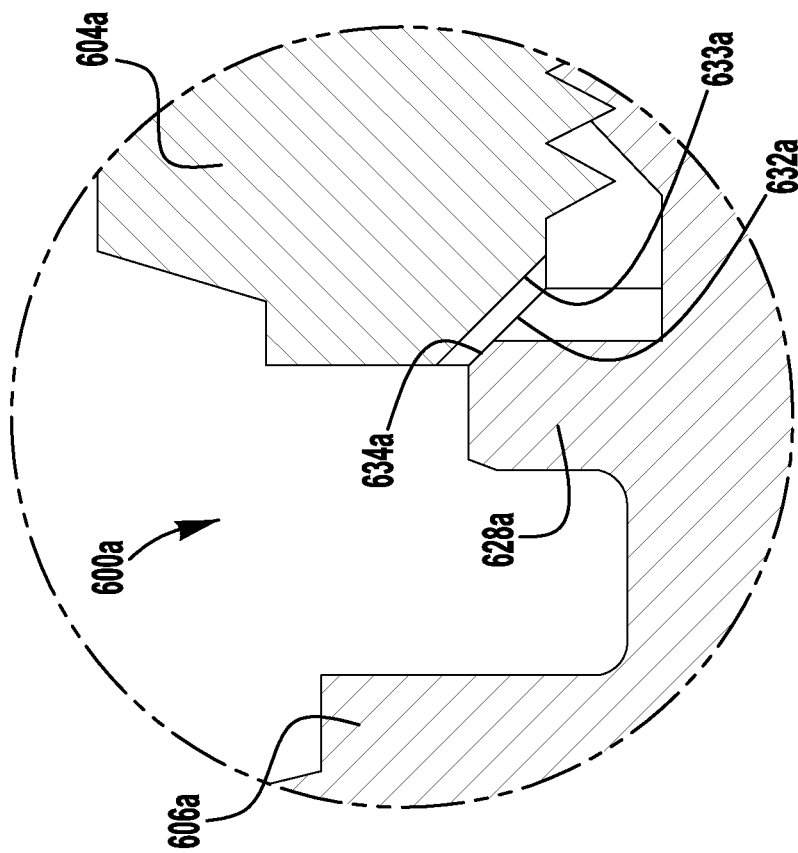
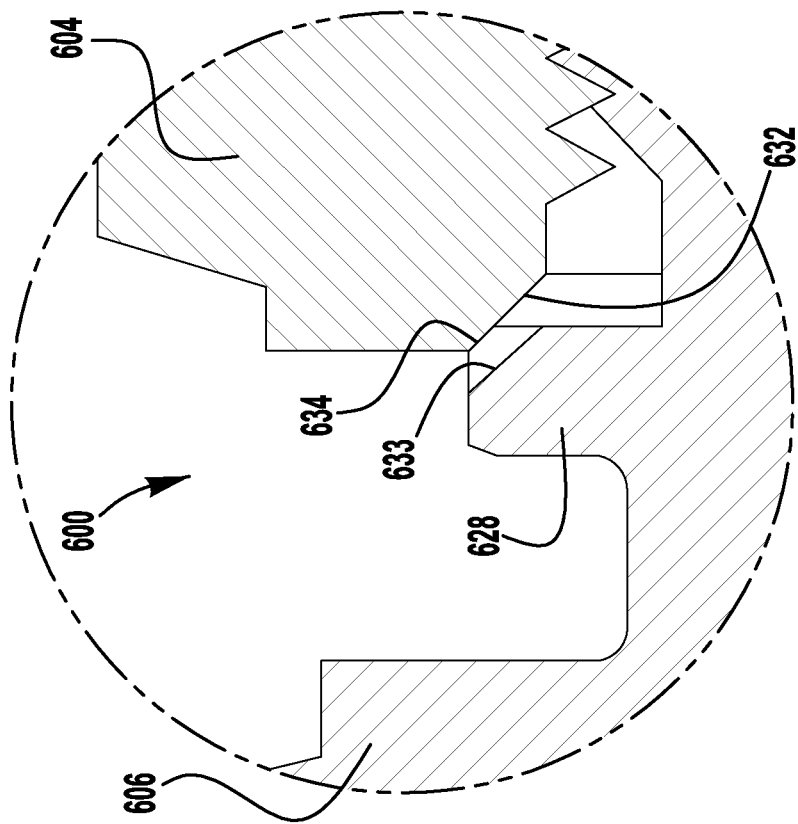

CONDUIT FITTING WITH STROKE RESISTING FEATURES

CROSS-REFERENCE TO RELATED APPLICATION

This application claims priority to and all benefit of U.S. Provisional Patent Application Ser. No. 62/311,971, filed on Mar. 23, 2016, for CONDUIT FITTING WITH STROKE RESISTING FEATURES, the entire disclosure of which is fully incorporated herein by reference.

TECHNICAL FIELD OF THE INVENTIONS

The present disclosure relates to fittings for metal conduits such as metal tube and pipe. More particularly, the disclosure relates to fittings that provide conduit grip and seal by tightening together mating threaded fitting components. One example of a conduit fitting is a flareless fitting that uses one or more conduit gripping devices to establish conduit grip and seal.

BACKGROUND OF THE DISCLOSURE

Conduit fittings are used in gas or liquid fluid systems to provide a fluid tight mechanical connection between a conduit and another fluid flow device, such as another conduit, a flow control device such as a valve or regulator, a port and so on. A particular type of conduit fitting commonly used is known as a flareless fitting that uses one or more conduit gripping devices such as ferrules, for example, to provide the grip and seal functions. Such fittings are popular as they do not require much preparation of the conduit end, other than squaring off and de-burring. We use the term "fitting" herein as a shorthand reference to a conduit fitting, such as a tube or pipe fitting, for example.

Other fittings, however, will be of interest for use with the present inventions, including any fitting design that is assembled by tightening together two mating threaded fitting components.

A conventional ferrule type fitting is pulled-up by turns, meaning that the threadably mating fitting components are tightened together a specified number of relative turns and partial relative turns with respect to each other past a reference position. The reference position is often a finger tight position. By controlling the number of turns and partial turns past the finger tight position, the relative stroke or axial advance of the fitting components together may be controlled to assure that the ferrules effectively grip and seal the conduit. Oftentimes, such fittings are loosened for various repair and maintenance activities in the fluid system, and then the loosened fitting is re-tightened, commonly referred to as "remake" or "remaking" the fitting. Such remakes may be done with the same fitting components and ferrules, or sometimes one or more parts are replaced.

SUMMARY OF THE DISCLOSURE

An exemplary inventive concept involves a fitting including a first annular surface that axially engages a second annular surface when a first fitting component is joined with a second fitting component on a conduit to a predetermined relative axial position of the first and second fitting components, with this engagement resulting in resistance to additional axial stroke of the first and second fitting components. Assembly to this predetermined relative axial position effects a seal between the conduit and a sealing element (e.g., a conduit gripping device, or one or more ferrules) disposed between the first and second fitting components, sealing the conduit from a non-wetted fitting interior volume at least partially defined by the first and second fitting components. According to an inventive aspect of the present application, at least one of the first annular surface and the second annular surface includes a recess extending from an inner diameter to an outer diameter of the corresponding annular surface, such that the recess defines a leak detection port in fluid communication with the fitting interior volume when the first annular surface is in engagement with the second annular surface.

Accordingly, in an exemplary embodiment of the present application, in accordance with one or more of the inventions, a fitting includes a first threaded fitting component, a conduit gripping device receivable within the first threaded fitting component, and a second threaded fitting component that threadably joins with the first threaded fitting component to produce relative axial stroke between the first threaded fitting component and the second threaded fitting component. When the fitting is pulled-up on a conduit, the first fitting component and the second fitting component can be joined together to a first relative axial position of the first and second fitting components to effect conduit grip and seal by the conduit gripping device, sealing the conduit from a non-wetted fitting interior volume at least partially defined by the first and second threaded fitting components. The fitting further includes a stroke resisting member having a first annular surface that axially engages a second annular surface of the fitting when the first fitting component and the second fitting component are joined together to the first relative axial position. The stroke resisting member resists additional axial stroke of the first and second fitting components, such that a tightening torque beyond the first relative axial position is increased by the axial engagement of the first and second annular surfaces. At least one of the first annular surface and the second annular surface includes a recess, extending from an inner diameter to an outer diameter of the corresponding annular surface, that defines a leak detection port in fluid communication with the fitting interior volume when the first annular surface is in axial engagement with the second annular surface.

These and other embodiments of various inventions disclosed herein will be understood by those skilled in the art in view of the accompanying drawings.

BRIEF DESCRIPTION OF THE DRAWINGS

FIG. 10 is an enlarged illustration of the circled portion of FIG. 9;

FIG. 10A is an enlarged partial cross-sectional view of another fitting according to an embodiment of one or more of the inventions herein, shown in a pulled-up position;

FIG. 16 is an enlarged illustration of the circled portion of FIG. 15;

FIG. 16A is an enlarged partial cross-sectional view of another fitting according to an embodiment of one or more of the inventions herein, shown in a pulled-up position;

FIG. 16B is an enlarged partial cross-sectional view of another fitting according to an embodiment of one or more of the inventions herein, shown in a pulled-up position;

FIG. 16C is an enlarged partial cross-sectional view of another fitting according to an embodiment of one or more of the invent

FIG. 17 is a longitudinal cross-sectional view of a fitting according to another embodiment of one or more of the inventions herein, shown in a finger tight position;

FIG. 19 is an enlarged illustration of the circled portion of FIG. 18;

FIG. 19A is an enlarged partial cross-sectional view of another fitting according to an embodiment of one or more of the inventions herein, shown in a pulled-up position;

DESCRIPTION OF THE EXEMPLARY EMBODIMENTS

Figure 1:
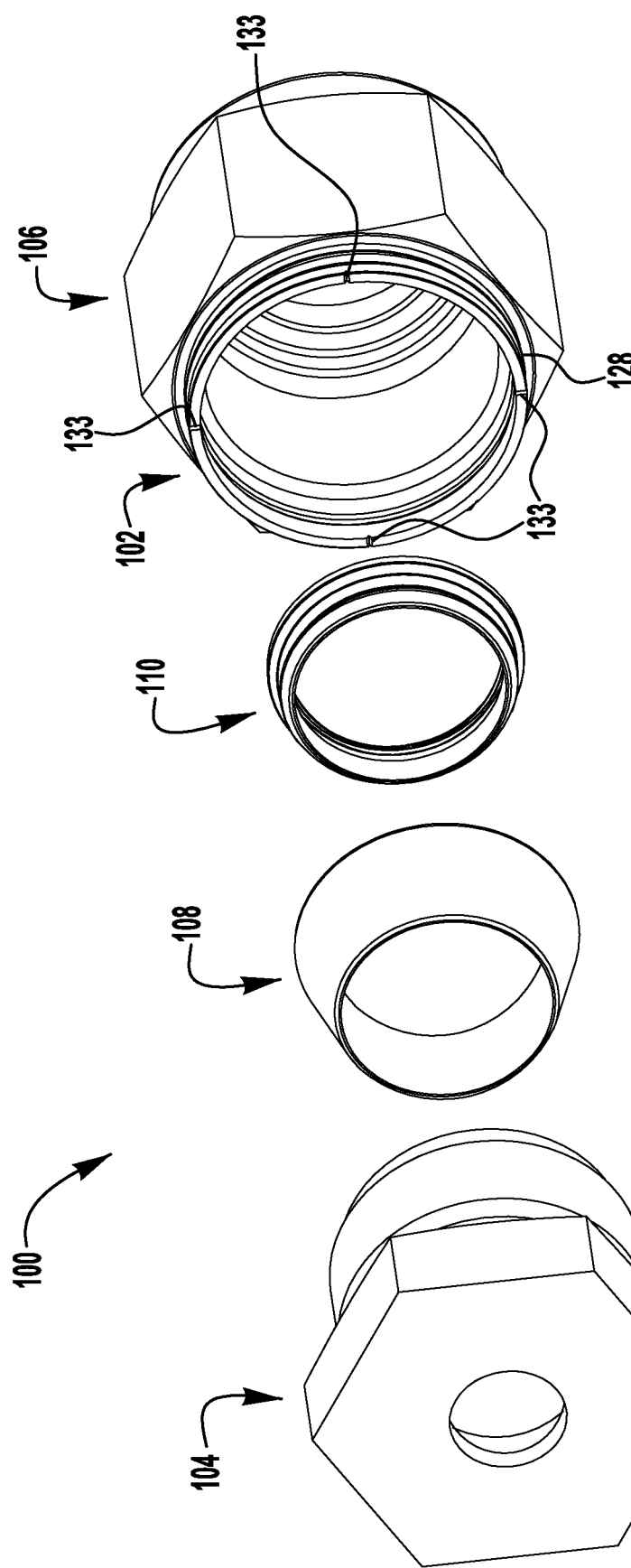
FIG. 1 is an exploded perspective view of a fitting according to an embodiment of one or more of the inventions herein.

Although the exemplary embodiments herein are presented in the context of a stainless steel tube fitting, the inventions herein are not limited to such applications, and will find use with many different conduits such as tube and pipe as well as many different suitable materials, including metals and non-metals for either the conduit, the gripping devices or the fitting components or any combination thereof. Exemplary materials include various stainless steels, including, for example, 316 stainless steel, 304 stainless steel, AL-6XN stainless steel alloy, 254 SMO stainless steel alloy, Inconel® alloy 625 stainless steel, and Incoloy® alloy 825 stainless steel, as well as Hastelloy®, brass, titanium, and aluminum, to name a few examples. The inventions may also be used for liquid or gas fluid systems. Although the inventions herein are illustrated with respect to exemplary design of the conduit gripping devices and fitting components, the inventions are not limited to use with such designs, and will find application in many different fitting designs that use one or more conduit gripping devices. In some fittings, in addition to the conduit gripping devices there may be one or more additional parts, for example seals. The inventions may be used with tube or pipe, so we use the term "conduit" to include tube or pipe or both. We generally use the terms "fitting assembly," "conduit fitting" and "fitting" interchangeably as a shorthand reference to an assembly of typically first and second fitting components along with one or more conduit gripping devices. In one example, one or more conduit gripping members may include heat treated hardened ferrules, with the heat treating being, for example, a case hardening of stainless steel or some other metal alloy by a lower temperature interstitial (e.g., carbon, nitrogen, or both) diffusion into the metal ferrule.

The concept of a "fitting assembly" may include assembly of the parts onto a conduit, either in a finger-tight, partial or complete pull-up position; but the term "fitting assembly" is also intended to include an assembly of parts together without a conduit, for example for shipping or handling, as well as the constituent parts themselves even if not assembled together. Fittings typically include two fitting components that are joined together, and one or more gripping devices, however, the inventions herein may be used with fittings that include additional pieces and parts. For example, a union fitting may include a body and two nuts.

The term "complete pull-up" as used herein refers to joining the fitting components together so as to cause the one or more conduit gripping devices to deform, usually but not necessarily plastically deform, to create a fluid tight seal and grip of a fitting assembly on a conduit. The conduit in many cases may also be plastically deformed during pull-up. A partial pull-up as used herein refers to a partial but sufficient tightening of the male and female fitting components together so as to cause the conduit gripping device or devices to deform so as to be radially compressed against and thus attached to the conduit, but not necessarily having created a fluid tight connection or the required conduit grip that is achieved after a complete pull-up. The term "partial pull-up" thus may also be understood to include what is often referred to in the art as pre-swaging wherein a swaging tool is used to deform the ferrules onto the conduit sufficiently so that the ferrules and the nut are retained on the conduit prior to being mated with the second fitting component to form a fitting assembly. A finger tight position or condition refers to the fitting components and conduit gripping devices being loosely assembled onto the conduit to an abutting position where the conduit gripping devices are in axial contact with and between the male and female fitting components, but without any significant tightening of the male and female fitting components together, usually typified by the conduit gripping device or devices not undergoing plastic deformation. We also refer to an initial or first pull-up or make-up to refer to the first time that a fitting is tightened to a complete pulled-up position, meaning that the ferrules and conduit had not been previously deformed. A subsequent pull-up or remake refers to any complete pull-up after a previous pull-up, whether that previous pull-up was the initial pull-up or a later pull-up or remake of the fitting.

We also use the term "fitting remake" and derivative terms herein to refer to a fitting assembly that has been at least once tightened or completely pulled-up, loosened, and then re-tightened to another completely pulled-up position. Effective remakes may be done with the same fitting assembly parts (e.g. nut, body, ferrules), for example, or may involve the replacement of one of more of the parts of the fitting assembly. An effective pull-up or remake or an effectively pulled-up or remade fitting as used herein is one that is effectively tightened (or re-tightened) to establish a mechanically attached connection with a conduit using the same or in some cases one or more replaced fitting parts, without adverse effects on fitting performance as to fluid tight seal and grip. In other words, an effective remake as used herein means a remake in which the fitting performance is not compromised or altered from its original performance criteria, specification or rating (for example, will achieve the same pressure rating upon remake within the allowed number of remakes as may be specified by the manufacturer). When we use the term remake in the context of the various embodiments and inventions herein, we are referring to effective remakes. We use the terms "effective remake" and "reliable remake" interchangeably herein. Reference herein to "outboard" and "inboard" are for convenience and simply refer to whether a direction is axially towards the center of a fitting (inboard) or away from the center (outboard).

We also use the term "flexible" herein to mean a structural characteristic of a member so that the member can deform, strain, bend, deflect, elongate or otherwise move or shift under load without fracturing or breaking. This flexible deformation may accompany a strain induced hardening. This flexible deformation may also accompany a permanent set or plastic deformation or may be a plastic deformation with an attendant elastic deformation, but at least some degree of plastic deformation is preferred to facilitate remakes. Further, the relative elastic and plastic deformations may be influenced or controlled by one or more of a strain hardening of the material from which the member is subsequently fabricated, a heat treated metallurgical or precipitation hardening of the material, and a low temperature interstitial case hardening of the member after fabrication.

When two threaded parts are tightened together to pull-up a fitting, turns and torque are related factors and applicable to the tightening process. For a tube or pipe fitting, this follows from the fact that when the threaded fitting components such as a nut and body are tightened together, the ferrule or ferrules undergo a plastic deformation and also in most cases plastically deform the conduit, and in many designs also can involve cutting into the exterior surface of the conduit or swaging the exterior surface of the conduit. These deformations, along with engaging threads and other metal to metal contact within the fitting, necessarily result in an increasing torque as the nut and body are tightened. For purposes of this disclosure, in the context of pulling up or making up a fitting by tightening together two threaded fitting components (for example, a nut and a body), pull-up "by torque" means tightening the parts together using a prescribed or predetermined or minimum torque without requiring a count of the number of relative turns and partial turns. A pull-up "by turns" means tightening the parts together using a prescribed or desired number of relative turns and/or partial turns past a reference position without requiring a predetermined torque. Pull-up by torque and pull-up by turns are used in association with both initial pull-up and remakes as further explained below.

Therefore, in an exemplary aspect of the present application, a fitting may be provided with a stroke resisting or load bearing surface that engages another surface of the fitting assembly during relative axial displacement of the threaded fitting components during pull-up, with this engagement resulting in a measurable increase in tightening or axial advancing torque. These engaging surfaces preferably do not engage at the reference position (from which pull-up by turns would otherwise be measured) but initially engage after additional relative axial displacement past this reference position. This is preferably the case for the first pull-up that a fitting undergoes. These engaging surfaces initially engage each other preferably to either coincide with or closely correspond to the relative axial displacement of the threaded fitting components that may be associated with the number of turns and partial turns past finger tight position for complete pull-up had the fitting been pulled-up alternatively by turns. In this way, a fitting can be optionally pulled-up by turns, by torque or both.

In some embodiments, the stroke resisting or load bearing surface may be provided on a flexible or deformable portion of the fitting, to allow for further axial advance or stroke of the threaded fitting components commonly required for fitting remakes. This flexible or deformable portion of the fitting may be disposed on one of the threaded fitting components (e.g., body or nut), or on a separate (e.g., a separate ring or collar) component assembled with or installed between the threaded fitting components. Exemplary embodiments of fittings having deformable stroke resisting portions are described in co-pending U.S. Patent Application Publication No. 2010/0213705, issuing on Mar. 29, 2016 as U.S. Pat. No. 9,297,481 (the "'481 Patent"), and co-pending U.S. Patent Application Publication Nos. US 2012/0005878 (the "'878 Application") and US 2015/0323110 (the "'110 Application"), the entire disclosures of each of which are incorporated herein by reference.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

In fittings having axially engaging stroke resisting portions (e.g., the exemplary fittings of the above incorporated '481 Patent and '878 and '110 Applications), a first annular surface of the stroke resisting portion may axially engage a second annular surface of the fitting (e.g., an annular surface of the first fitting component, the second fitting component, or some other component assembled with the fitting) when first and second fitting components (e.g., threaded nut and body) are pulled up or otherwise assembled to a predetermined relative axial position, with this axial engagement resisting further axial advancement of the first and second fitting components. Engagement of these annular surfaces may seal or impede fluid passage between the annular surfaces, at least along some portions of the annular surfaces, from a normally non-wetted interior volume of the fitting (e.g., between a conduit sealing element and the internal surfaces of the first and second fitting components) to an external area surrounding the fitting.

According to an inventive aspect of the present application, at least one of these axially engaging first and second annular surfaces includes at least one radially extending recess extending across the annular surface, such that when the first and second annular surfaces are in axial engagement, the recess defines or provides a leak detection port in fluid communication with the normally non-wetted fitting interior volume, for example, to facilitate detection of fluid leakage past a conduit sealing element (e.g., a conduit gripping device, or one or more ferrules) into the fitting interior volume.

In one embodiment, a fitting includes a first threaded fitting component (e.g., a female threaded nut), a conduit gripping device (e.g., front and rear ferrules) receivable within the first threaded fitting component, a second threaded fitting component (e.g., a male threaded body) that threadably joins with the first threaded fitting component to produce relative axial stroke between the first threaded fitting component and the second threaded fitting component, and a stroke resisting member. When the fitting is pulled-up on a conduit the first fitting component and the second fitting component can be joined together to a first relative axial position of the first and second fitting components to effect conduit grip and seal by the conduit gripping device, sealing the conduit from a non-wetted fitting interior volume at least partially defined by the first and second threaded fitting components. The stroke resisting member has a first axial length and is disposed between a threaded portion of the first fitting component and a radially extending portion of the second fitting component. A first annular surface of the stroke resisting member is axially engaged by a second annular surface of the radially extending portion of the second fitting component when the first and second fitting components are joined together to the first relative axial position, the stroke resisting member resisting additional axial stroke of the first and second fitting components, such that a tightening torque beyond the first relative axial position is increased by the axial engagement. The stroke resisting member is plastically compressed to a second axial length smaller than the first axial length when the first and second fitting components are joined together to a second relative axial position advanced beyond the first relative axial position. At least one of the first annular surface and the second annular surface includes a recess extending from an inner diameter to an outer diameter of the corresponding annular surface, the recess defining a leak detection port in fluid communication with the fitting interior volume when the first annular surface is in axial engagement with the second annular surface.

In another embodiment, a fitting for conduits includes a first threaded fitting component (e.g., a female threaded nut), a conduit gripping device (e.g., front and rear ferrules) receivable within the first threaded fitting component, a second threaded fitting component (e.g., a male threaded body) that threadably joins with the first threaded fitting component to produce relative axial stroke between the first threaded fitting component and the second threaded fitting component, and a stroke resisting member. When the fitting is pulled-up on a conduit the first fitting component and the second fitting component can be joined together to a first relative axial position of the first and second fitting components to effect conduit grip and seal by the conduit gripping device, sealing the conduit from a non-wetted fitting interior volume at least partially defined by the first and second threaded fitting components. The stroke resisting member includes a first end portion axially fixed to the first fitting component and having a first radial thickness, a second end portion including a radially extending bearing portion having a second radial thickness and defining a first annular surface that engages a second annular surface of the fitting when the fitting is pulled up to the first relative axial position, and a web connecting the first and second end portions, the web having a third radial thickness smaller than each of the first and second radial thicknesses and defining an axially deformable portion. At least one of the first annular surface and the second annular surface includes a recess extending from an inner diameter to an outer diameter of the corresponding annular surface, the recess defining a leak detection port in fluid communication with the fitting interior volume when the first annular surface is in axial engagement with the second annular surface.

In yet another embodiment, a fitting for conduits includes a first threaded fitting component (e.g., a female threaded nut), a conduit gripping device (e.g., front and rear ferrules) receivable within the first threaded fitting component, a second threaded fitting component (e.g., a male threaded body) that threadably joins with the first threaded fitting component to produce relative axial stroke between the first threaded fitting component and the second threaded fitting component, and a stroke resisting member disposed between a threaded portion of the first fitting component and a radially extending portion of the second fitting component. When the fitting is pulled-up on a conduit the first fitting component and the second fitting component can be joined together to a first relative axial position of the first and second fitting components to effect conduit grip and seal by the conduit gripping device, sealing the conduit from a non-wetted fitting interior volume at least partially defined by the first and second threaded fitting components. The stroke resisting member includes an annular body having a central axis and comprising a proximal ring portion having a first radial thickness, a distal ring portion having a second radial thickness and defining a first annular surface that engages a second annular surface of the fitting when the fitting is pulled up to the first relative axial position, a first wall portion having a third radial thickness smaller than the first radial thickness and extending axially from the proximal ring toward the distal ring, a second wall portion having a fourth radial thickness smaller than the second radial thickness and extending axially from the distal ring toward the proximal ring, and a web connecting the first and second wall portions. The web is angled with respect to each of the first and second wall portions to define a hinge portion. At least one of the first annular surface and the second annular surface includes a recess extending from an inner diameter to an outer diameter of the corresponding annular surface, the recess defining a leak detection port in fluid communication with the fitting interior volume when the first annular surface is in axial engagement with the second annular surface.

In the various embodiments described herein, the stroke resisting member may be integral or non-integral with the first fitting component. Additionally or alternatively, the stroke resisting member may be assembled with the first fitting component, such that the first fitting component and the stroke resisting member are retained together as a discontinuous preassembly. Additionally or alternatively, the stroke resisting member may be cartridged with the first fitting component. Additionally or alternatively, the stroke resisting member may be freely rotatable with respect to the first fitting component prior to axial engagement by the radially extending portion of the second fitting component when the first and second fitting components are joined together to the first relative axial position. Additionally or alternatively, the stroke resisting member may be axially fixed to the first fitting component.

In the various embodiments described herein, the proximal ring portion of the stroke resisting member may be integral with the first fitting component. Additionally or alternatively, the first fitting component may be a fitting nut, with the proximal ring portion (or first end portion of the stroke resisting member) including an enlarged portion of the fitting nut. Additionally or alternatively, the proximal ring portion may include a radially inward extending protrusion for cartridging engagement with a threaded fitting component. Additionally or alternatively, the distal ring portion of the stroke resisting member may include a radially extending bearing surface for engaging a radially extending portion of the second fitting component. Additionally or alternatively, the first wall portion of the stroke resisting member may extend from an inner radial portion of the proximal ring. Additionally or alternatively, the second wall portion of the stroke resisting member may extend from an inner radial portion of the distal ring. Additionally or alternatively, the first wall portion may have a first outer diameter, with the second wall portion having a second outer diameter different from the first outer diameter. Additionally or alternatively, the first wall portion may have a first inner diameter, with the second wall portion having a second inner diameter different from the first inner diameter. Additionally or alternatively, the web of the stroke resisting member may include a portion that is generally V-shaped when viewed in longitudinal cross-section. Additionally or alternatively, the stroke resisting member may be generally W-shaped when viewed in longitudinal cross-section. Additionally or alternatively, the axially deformable portion of the web may be entirely radially outward of the first and second wall portions. Additionally or alternatively, the web may plastically deform under axial compression, thereby reducing the axial length of the stroke resisting member. Additionally or alternatively, the web may buckle when an axial load is applied to one of the proximal ring portion and the distal ring portion, thereby reducing the axial length of the stroke resisting member.

In the various embodiments described herein, the first relative axial position may correspond to a predetermined number of relative turns of the first and second fitting components past a finger-tight position sufficient to effect conduit grip and seal by the conduit gripping device in an initial pull-up of the fitting. Additionally or alternatively, the second relative axial position may correspond to a number of relative turns of the first and second fitting components past a finger tight position of the fitting in a remake subsequent to an initial pull-up of the fitting, sufficient to effect conduit grip and seal by the conduit gripping device. Additionally or alternatively, the first relative axial position may correspond to a predetermined number of relative turns of the first and second fitting components past a prescribed partially tightened condition used to fix the conduit gripping device to a conduit, with the predetermined number of relative turns being sufficient to effect conduit grip and seal by the conduit gripping device. Additionally or alternatively, the first relative axial position may be identified by a first predetermined measured tightening torque during an initial pull-up of the first and second fitting components. Additionally or alternatively, the second relative axial position may be identified by a second predetermined measured tightening torque during a remake of the fitting subsequent to the initial pull-up of the first and second fitting components. Additionally or alternatively, the second measured tightening torque may be substantially the same as the first measured tightening torque. Additionally or alternatively, the plastic compression of the stroke resisting member to the second axial length may result in the second measured tightening torque being substantially the same as the first measured tightening torque. Additionally or alternatively, the second annular surface may be disposed on the second fitting component.

Figure 2:
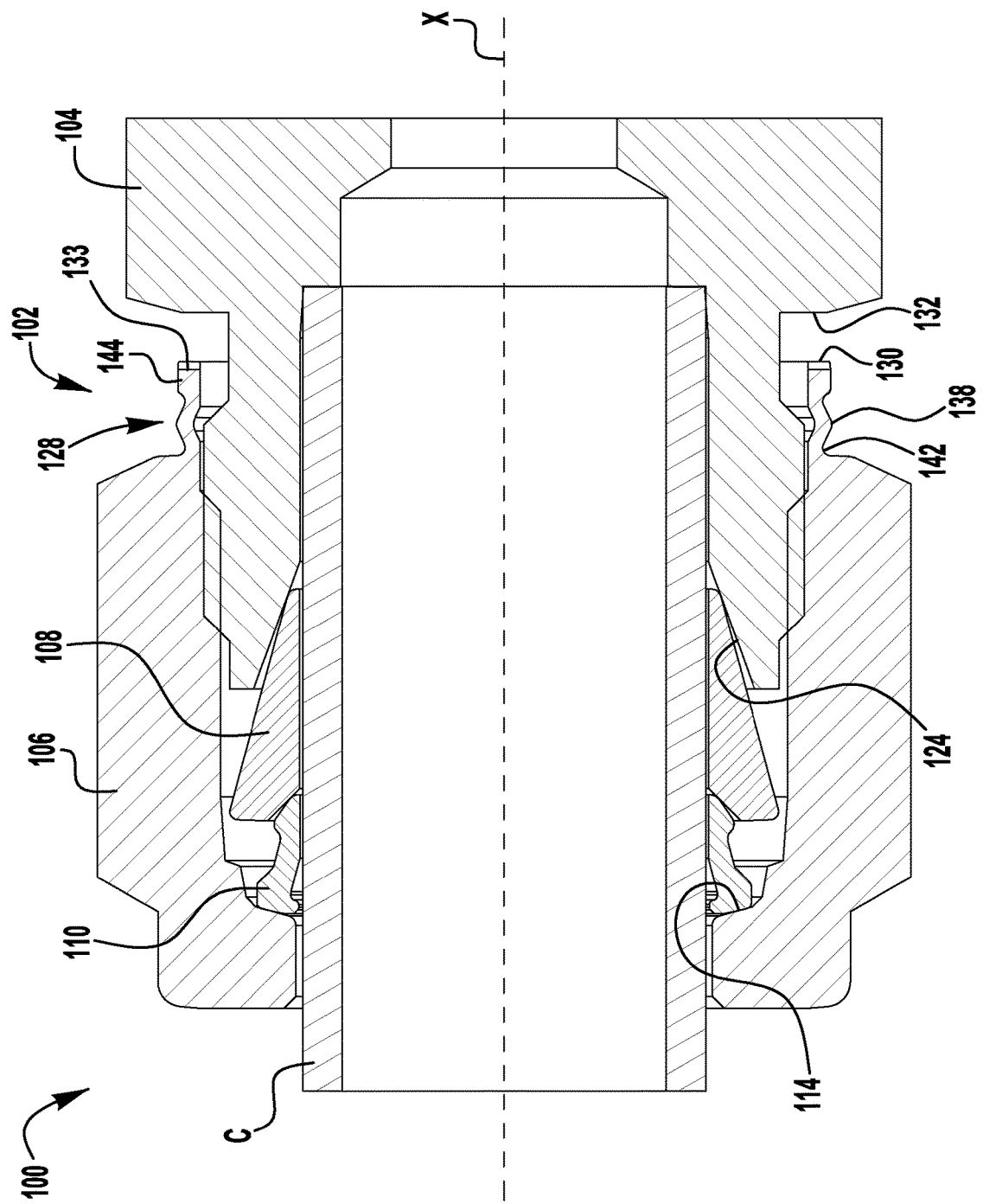
FIG. 2 is a longitudinal cross-sectional view of the fitting of FIG. 1, shown in a finger tight position.
Figure 3:
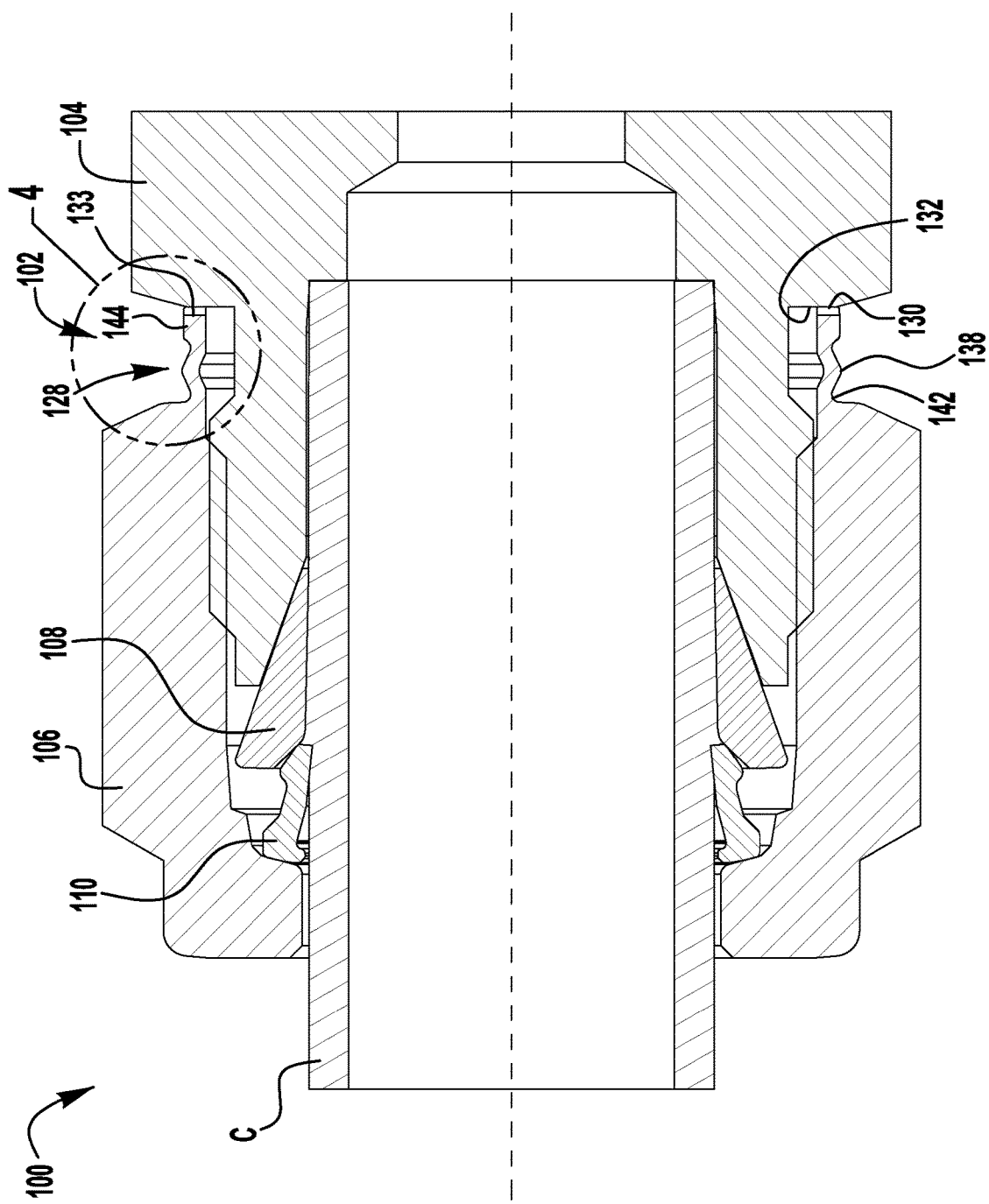
FIG. 3 is a longitudinal cross-sectional view of the fitting of FIG. 1, shown in a pulled-up position.

FIGS. 1-4 illustrate exemplary embodiments of a fitting 100 having a stroke resisting torque collar 102 to facilitate pull-up by torque, as described in greater detail below. The exemplary fitting 100 includes a first fitting component 104 which may be in the form of a threaded body and also will be referred to herein as the body for short; and a second fitting component 106 which may be in the form of a threaded nut and also will be referred to herein as the nut for short. The body 104 includes a threaded portion that mates with threads of a nut, a camming mouth that receives the forward portion of a conduit gripping device, and a bore that receives an end of a conduit C (FIG. 2). The conduit gripping device may be realized in many forms as is well known, including but not limited to a single ferrule or a pair of ferrules, the latter commonly referred to as a front ferrule and a back or rear ferrule. In the illustrated embodiments of FIGS. 1-4, the conduit gripping device includes front and rear ferrules 108, 110, a forward portion of the front ferrule 108 engaging the camming mouth of the body 104, a forward portion of the back ferrule 110 engaging a camming surface at a rearward portion of the front ferrule 108, and a back end of the back ferrule 110 engages a drive surface 114 of the nut 106. Although the embodiments of FIGS. 1-4 illustrate a male style fitting—meaning that the body 104 is male threaded and the nut 106 is female threaded, alternatively the inventions may be used with female style fittings, in which the body is female threaded and the nut is male threaded (see, e.g., FIGS. 17 and 18).

The number of turns (full and partial) past the finger tight position (also referred to herein as relative rotation between the body 104 and the nut 106) directly corresponds to relative axial stroke or translation between the body 104 and the nut 106 as the fitting 100 is pulled-up (also referred to herein as tightening the fitting). As noted, fittings are usually specified by the manufacturer to be pulled-up a specific number of turns and partial turns past the reference position, for example, the finger tight position (e.g., 1¼ or 1½ turns past finger tight). Such is the case for the first or initial time that a fitting is pulled-up. For remakes, typically the fitting is again assembled to the finger tight position and then tightened or snugged up for a partial turn, for example, approximately ⅛ turns although this amount will depend in part on how many remakes are made because the additional stroke consumed during remakes becomes smaller as the number of remakes increases. For both remakes and an initial pull-up, the finger tight reference position is that position at which the nut 106 contacts the back ferrule 110 with the ferrules in contact with each other and the front ferrule 108 in contact with the camming mouth 124 of the body 104.

In the illustrated embodiments of FIGS. 1-4, the torque collar 102 is integral with the nut 106 to form a one-piece component. In other embodiments, the torque collar may be a separate part, or may be a separate part that is attached to or cartridged with the nut 106 as described in other exemplary embodiments below. Whether the torque collar 102 is integral with the nut 106 or a separate part, the torque collar may deform in a similar manner and may be used to effect pull-up of the fitting 100 by torque rather than by turns.

The torque collar 102 is generally in the form of an annular stroke resisting portion or stroke resisting member 128. The stroke resisting member 128 provides a structure that may be used to resist additional relative stroke between the body 104 and the nut 106 during pull-up. In the embodiments of FIGS. 1-4, once the distal annular stroke resisting surface 130 of the stroke resisting member 128 contacts a contacting annular surface 132 of the body 104 (as shown in FIG. 2), further relative rotation between the body 104 and the nut 106 applies an axial load or compression on the stroke resisting member 128. As discussed in the above incorporated '110 Application, the controlled resistance to additional relative axial stroke between the body 104 and the nut 106, based on the configuration and geometry of the stroke resisting member 128, may be used to allow for fitting pull-up by torque rather than pull-up by turns, with the stroke resisting member configured for at least partial plastic compression (e.g., bucking, collapsing) during pull-up so that pull-up by torque may also be used on remakes.

The stroke resisting member 128 may utilize a variety of configurations and geometries to provide the desired controlled resistance to further axial advance of the body 104 and nut 106. In the illustrated embodiments of FIGS. 1-4, similar to the embodiment of FIGS. 27 and 28 of the above incorporated '110 Application, the stroke resisting member 128 includes a generally W shaped profile having a middle web portion 138 extending between a proximal ring portion 142 and a distal ring portion or flange 144 that defines the annular stroke resisting surface 130 (FIG. 2). The angled walls of the middle web portion may define a hinge portion to faciliate axial compression or deformation under axial load. Other exemplary geometries and configurations that may be utilized for the axially compressible stroke resisting portion of the fitting are described in the above incorporated '110 Application.

Figure 1A:
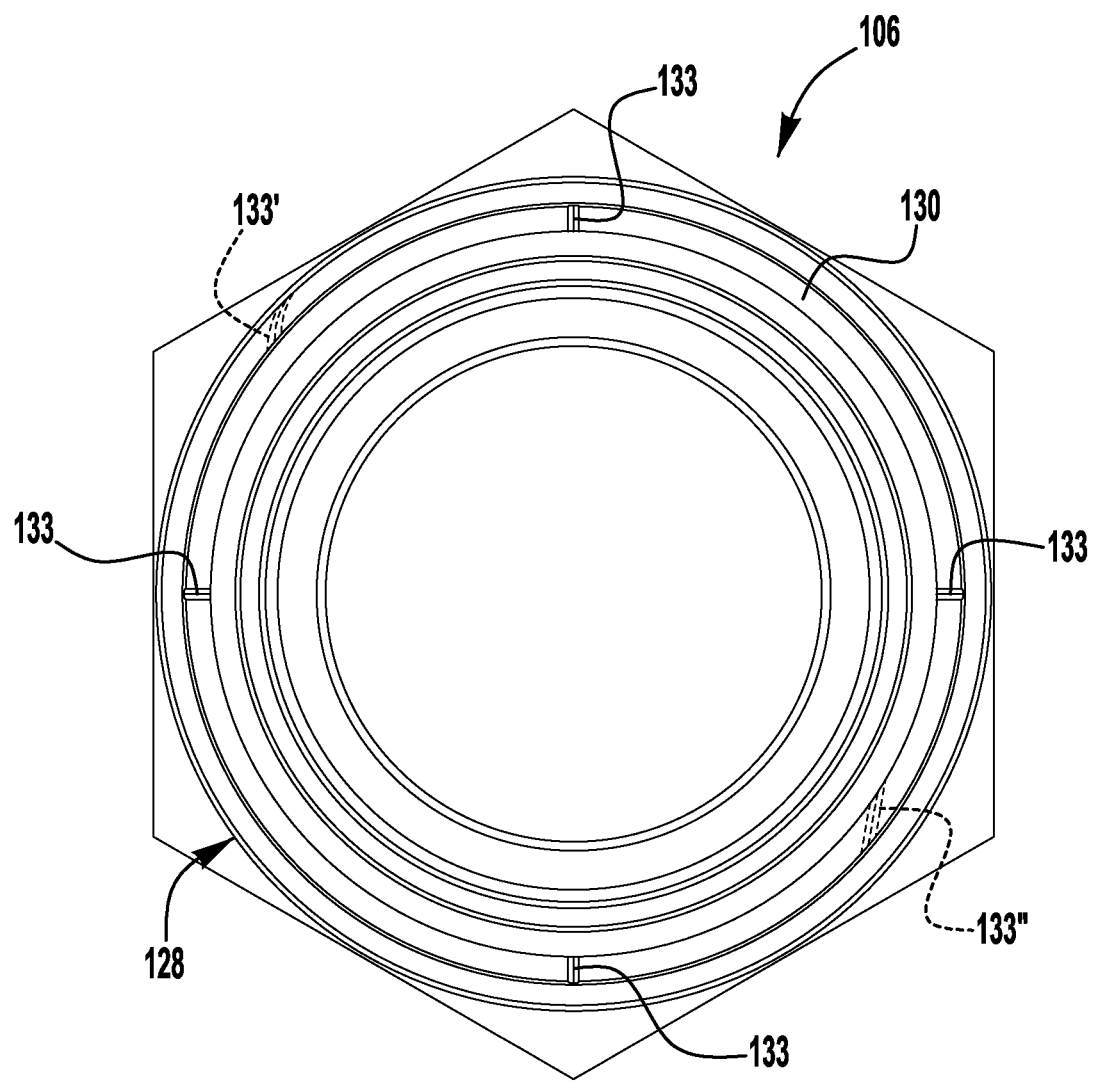
FIG. 1A is a rear view of the fitting nut of the fitting of FIG. 1
Figure 4A:
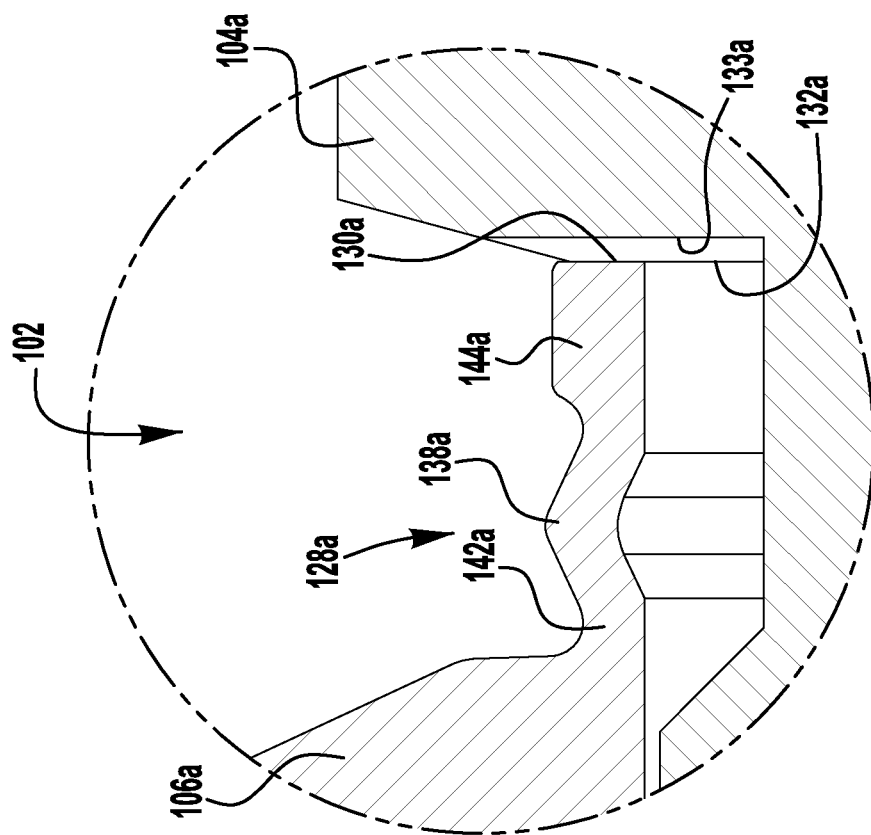
FIG. 4A is an enlarged partial cross-sectional view of another fitting according to an embodiment of one or more of the inventions herein, shown in a pulled-up position.
Figure 4:
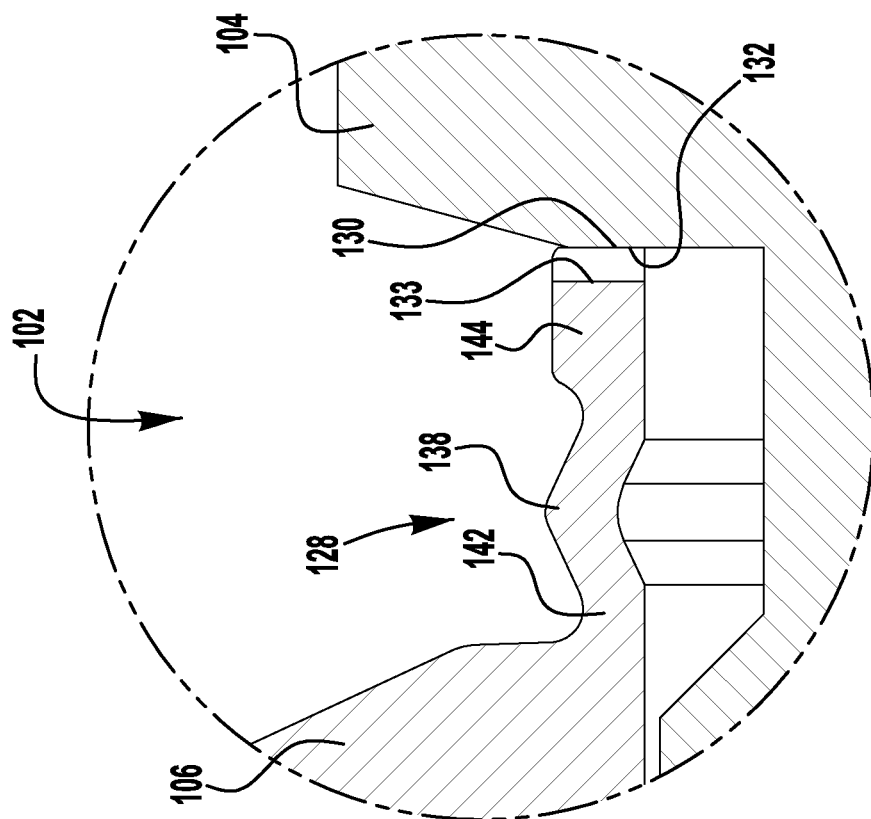
FIG. 4 is an enlarged illustration of the circled portion of FIG. 3.
Figure 5:
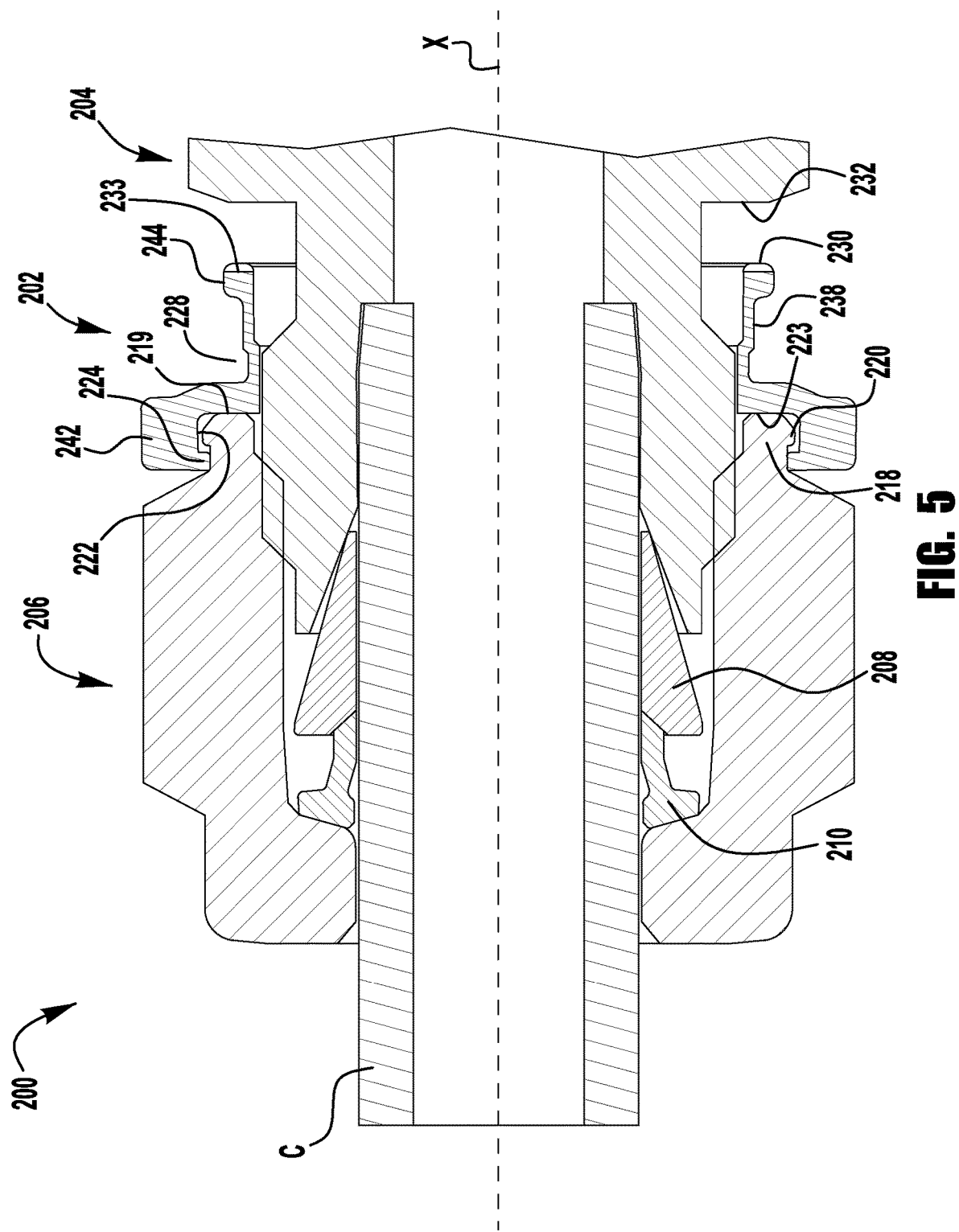
FIG. 5 is a longitudinal cross-sectional view of a fitting according to another embodiment of one or more of the inventions herein, shown in a finger tight position.

In one embodiment, as best shown in FIGS. 1A and 4, the distal annular surface 130 of the stroke resisting member 128 includes one or more radially extending recesses 133. In the illustrated embodiment, the recesses 133 are grooves formed (e.g., machined, embossed, or molded) in the annular surface. While the recesses 133 are shown as extending entirely radially, or perpendicular to the central axis X of the fitting 100, in other embodiments, the radially extending recesses may extend partially circumferentially or tangentially (e.g., e.g., spiral/curved, as shown in phantom at 133' or tangentially angled with respect to the radial orientation, as shown in phantom at 133") across the annular surface 130, with the recesses extending from an inner diameter of the annular surface (i.e., an inner edge of the surface 130 in contact with the annular surface 132 of the body 104) to an outer diameter of the annular surface (i.e., an outer edge of the surface 130 in contact with the annular surface 132 of the body 104) to maintain a leak detection port. These other embodiments may, for example, aid certain methods of manufacture, resist blockage or closure with repeated tube fitting remakes, and/or provide other desirable contact surface properties (e.g., increased surface friction). Other example of radially extending recesses include cross-hatched or knurled recesses, or zigzagged recesses. In one such embodiment, a curved or tangential recess 133', 133" may extend radially outward and in a clockwise direction, for example, to reduce friction-based tightening torque and/or increase friction-based disassembly torque when the annular surface 130 is in contact with the body surface 132. In other embodiments (not shown), a curved or tangential recess may extend radially outward and in a counterclockwise direction, for example, to increase friction-based tightening torque and/or decrease friction-based disassembly torque when the annular surface is in contact with the body surface. Note that as described herein, the distal annular surface 130 of the stroke resisting member 128 need not extend across the entire end face of the stroke resisting member 128.

The radially extending recesses 133 may be sized and oriented to provide leak detection ports for the fitting 100 when the nut 106 and body 104 are pulled up to the first relative axial position, such that fitting leakage (e.g., leakage past the ferrules 108, 110 into the normally non-wetted interior volume of the fitting 100) may be detected at the leak detection ports, for example, by use of an electronic leak detection probe or application of a leak detection fluid. As such, the recesses 133 may be sized for visual identification by the user (e.g., a maximum width of about 0.004" to about 0.030", or about 0.010", and a depth of about 0.004" to about 0.030", or about 0.010"), and may be oriented to ensure ease of access by a user (e.g., 4-6 recesses evenly spaced around the circumference of the stroke resisting member 128). Other sizes, shapes, and numbers of recesses (e.g., 1-8 recesses) may additionally or alternatively be utilized. In the illustrated embodiment, the recesses 133 have a V-notch cross-sectional shape. In other exemplary embodiments, cross-sectional shapes of the recess grooves may include, for example, buttress or half V-notch, radius tipped V-notch, truncated V-notch or trapezoidal, semicircular, semielliptical, rectangular, square, semi-hexagonal, semi-diamond shaped, semi-octagonal, or a combination of these shapes.

In another embodiment, radially extending recesses may additionally or alternatively be provided in the annular surface of the fitting body that contacts the stroke resisting surface of the stroke resisting member. As shown in the enlarged partial view of FIG. 4A, in an alternative embodiment, an annular contacting surface 132a of the body 104a includes a plurality of radially extending recesses 133a. In the illustrated embodiment, the recesses 133a are grooves formed (e.g., machined, embossed, or molded) in the annular surface. While the recesses 133a are shown as extending entirely radially, or perpendicular to the central axis of the fitting, in other embodiments, the radially extending recesses may extend partially circumferentially or tangentially across the annular surface (e.g., spiral curved recesses, recesses angled with respect to a radial orientation, cross-hatched or knurled recesses, or zigzagged recesses), with the recesses extending from an inner diameter of the annular surface (i.e., an inner edge of the contacting surface 132a in contact with the annular surface 130a of the stroke resisting member 128a) to an outer diameter of the annular surface (i.e., an outer edge of the contacting surface 132a in contact with the annular surface 130a of the stroke resisting member 128a) to maintain a leak detection port. Note that as described herein, the annular contacting surface 132a of the body 104a need not extend across the entire shoulder of the body. Similar to the recesses 133 of FIG. 4, the radially extending recesses 133a may be sized and oriented to provide leak detection ports for the fitting when the nut 106a and body 104a are pulled up to the first relative axial position, such that fitting leakage may be detected at the leak detection ports, for example, by use of an electronic leak detection probe or application of a leak detection fluid.

In other embodiments, axially engaging surfaces defining one or more leak detection ports may be provided with a fitting having a stroke resisting member that is assembled with (e.g., cartridged with) one of the threaded fitting components (e.g., the fitting nut) for engagement with a surface of the other threaded fitting component (e.g., the fitting body) when the threaded fitting components are pulled up to a first relative axial position (e.g., corresponding to a complete pull-up of the fitting sufficient to effect conduit grip and seal by the ferrules).

FIGS. 5-7C illustrate exemplary embodiments of a fitting 200, similar to the fitting of FIGS. 1-4, except having a separate stroke resisting torque collar 202 assembled with or cartridged to a fitting nut 206, similar to several of the embodiments of the above incorporated '110 Application (see, e.g., the embodiments of FIGS. 14-22, 25-29A, and 32-35B of the '110 Application). The torque collar 202 is generally in the form of an annular stroke resisting portion or stroke resisting member 228 including a first or proximal end ring portion 242 defining a cartridging feature, a second or distal end ring portion 244 defining an annular stroke resisting surface 230, and an, axially compressible or deformable intermediate web portion 238 (which may be similar to one of the embodiments of the above incorporated '110 Application or to the web portion 138 of the embodiments of FIGS. 1-4). As shown, the axially deformable portion 238 includes first and second wall portions having different diameters (e.g., different outer diameters and/or inner diameters) to facilitate buckling or other such deformation of the axially deformable portion 238 under axial load.

Many different arrangements may be utilized to assemble or cartridge the stroke resisting member 228 with the fitting nut 206. In the illustrated embodiments of FIGS. 5-7C, similar to several embodiments of the above incorporated '110 Application, the nut 206 includes a cartridge feature in the form of an annular extension 218 having a radially outward rib 220, and the stroke resisting member 228 includes a cartridge feature in the form of a recess or pocket 222 and a radially inward extending hook portion 224. Either or both of the rib 220 and the hook portion 224 are elastically deformable to allow the nut extension 218 to be inserted into the pocket 222 with the rib 220 and hook portion snapping into interlocking or cartridging engagement.

Figure 6:
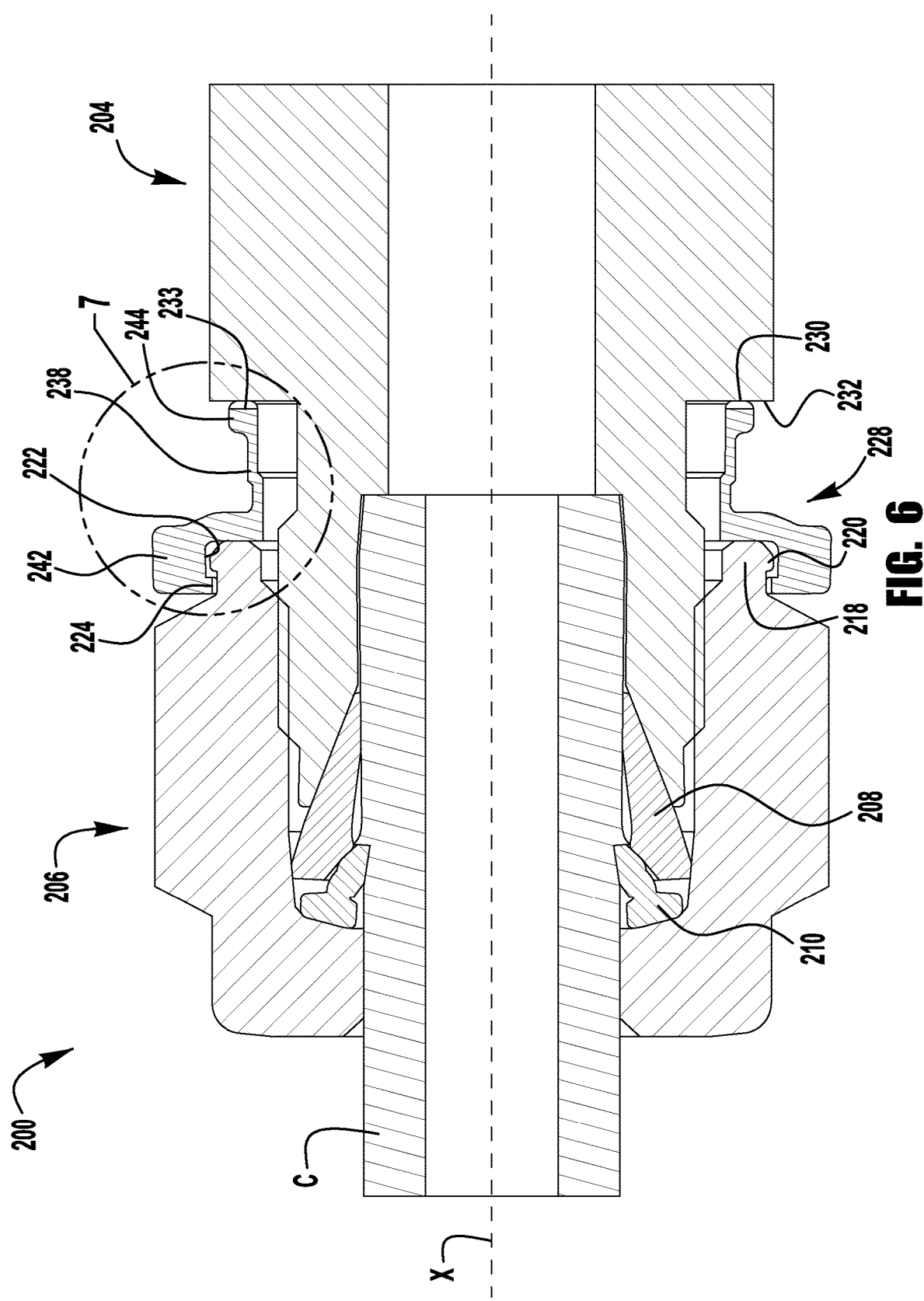
FIG. 6 is a longitudinal cross-sectional view of the fitting of FIG. 5, shown in a pulled-up position.

Once the distal annular stroke resisting surface 230 of the stroke resisting member 228 contacts a contacting annular surface 232 of the body 204 (as shown in FIG. 6), further relative rotation between the body 204 and the nut 206 applies an axial load or compression on the stroke resisting member 228. As discussed in the above incorporated '110 Application, the controlled resistance to additional relative axial stroke between the body 204 and the nut 206, based on the configuration and geometry of the stroke resisting member 228, may be used to allow for fitting pull-up by torque rather than pull-up by turns, with the stroke resisting member configured for at least partial plastic compression (e.g., bucking, collapsing) during pull-up so that pull-up by torque may also be used on remakes.

Figure 7A:
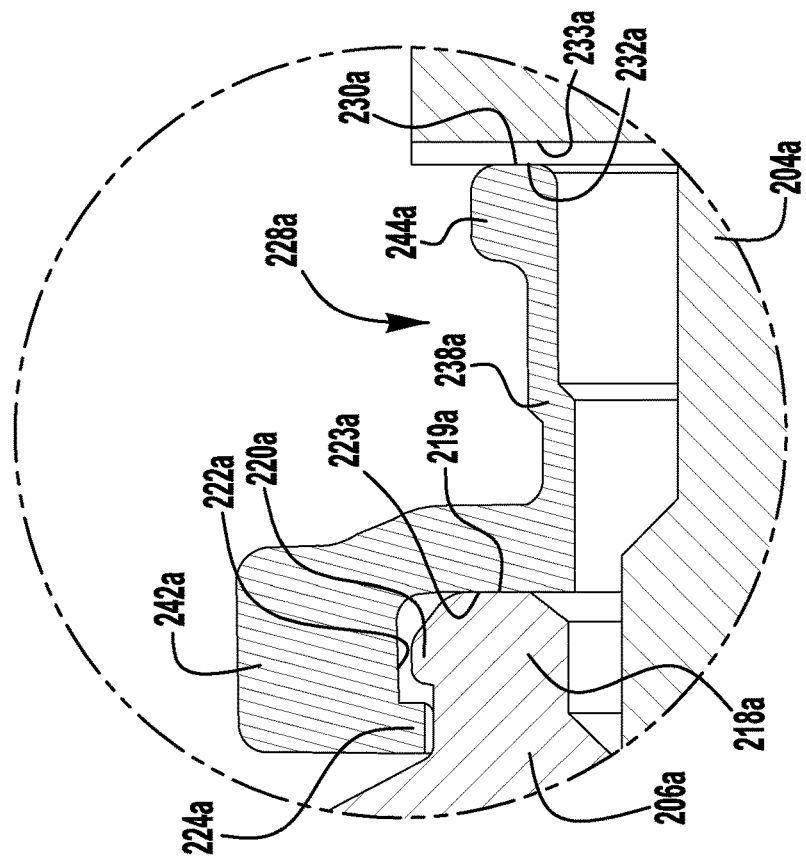
FIG. 7A is an enlarged partial cross-sectional view of another fitting according to an embodiment of one or more of the inventions herein, shown in a pulled-up position.
Figure 7:
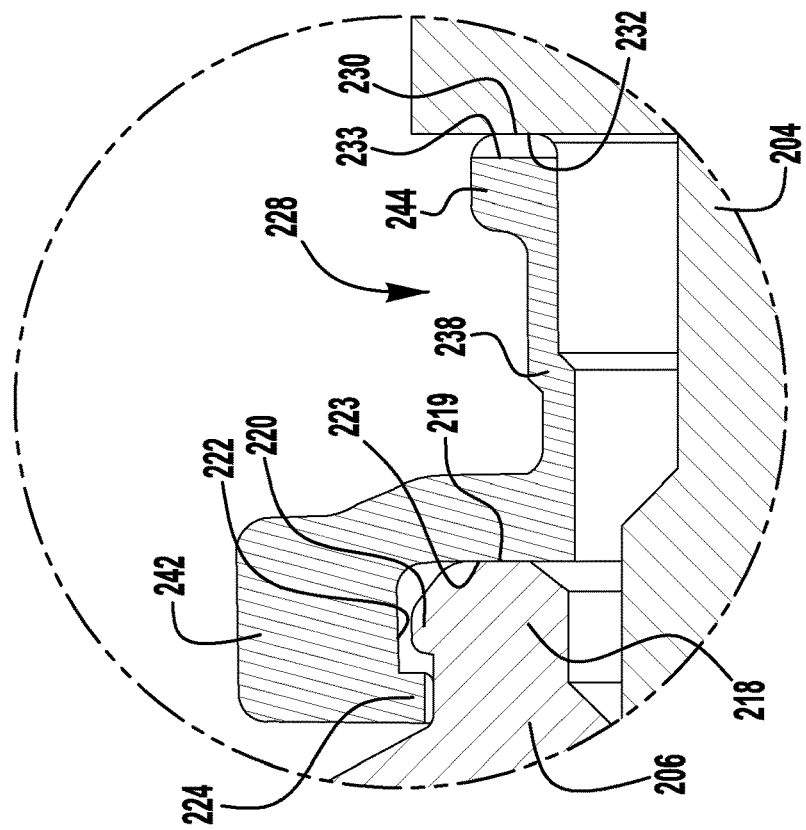
FIG. 7 is an enlarged illustration of the circled portion of FIG. 6.
Figure 7C:
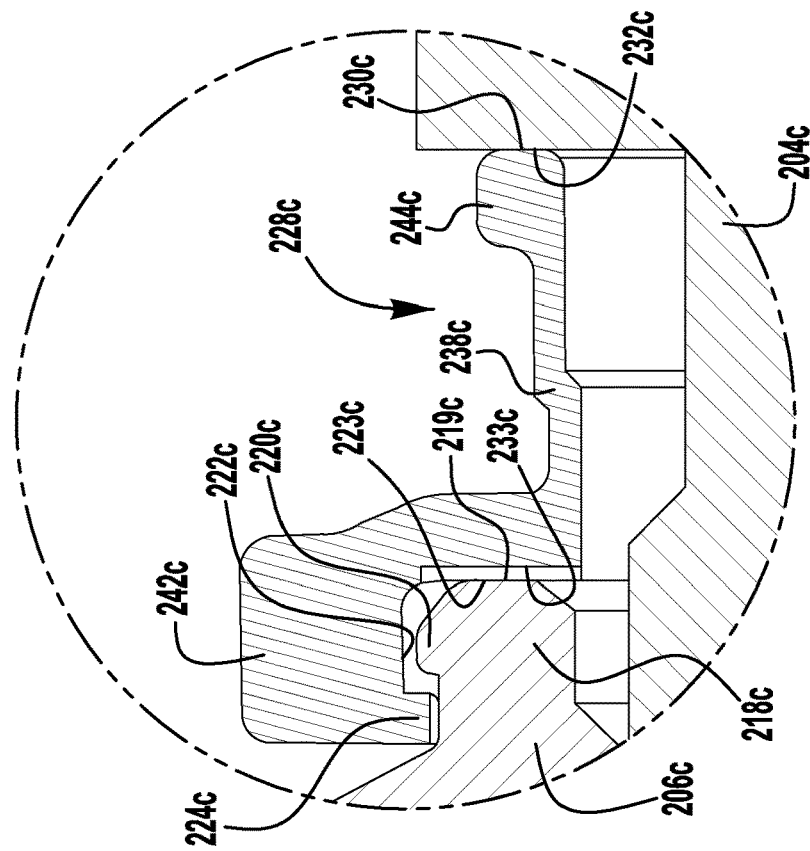
FIG. 7C is an enlarged partial cross-sectional view of another fitting according to an embodiment of one or more of the inventions herein, shown in a pulled-up position.

In one embodiment, as best shown in FIG. 7, the distal annular surface 230 of the stroke resisting member 228 includes one or more radially extending recesses 233. In the illustrated embodiment, the recesses 233 are grooves formed (e.g., machined, embossed, or molded) in the annular surface. While the recesses 233 are shown as extending entirely radially, or perpendicular to the central axis X of the fitting 200, in other embodiments, the radially extending recesses may extend partially circumferentially or tangentially across the annular surface 230 (e.g., spiral curved recesses, recesses angled with respect to a radial orientation, cross-hatched or knurled recesses, or zigzagged recesses), with the recesses extending from an inner diameter of the annular surface (i.e., an inner edge of the surface 230 in contact with the annular surface 232 of the body 204) to an outer diameter of the annular surface (i.e., an outer edge of the surface 230 in contact with the annular surface 232 of the body 204) to maintain a leak detection port. Note that as described herein, the distal annular surface 230 of the stroke resisting member 228 need not extend across the entire end face of the stroke resisting member 228.

The radially extending recesses 233 may be sized and oriented to provide leak detection ports for the fitting 200 when the nut 206 and body 204 are pulled up to the first relative axial position, such that fitting leakage (e.g., leakage past the ferrules 208, 210 into the normally non-wetted interior volume of the fitting 200) may be detected at the leak detection ports, for example, by use of an electronic leak detection probe or application of a leak detection fluid. As such, the recesses 233 may be sized for visual identification by the user (e.g., a maximum width of about 0.004" to about 0.030", or about 0.010", and a depth of about 0.004" to about 0.030", or about 0.010"), and may be oriented to ensure ease of access by a user (e.g., 4-6 recesses evenly spaced around the circumference of the stroke resisting member 128). Other sizes, shapes, and numbers of recesses (e.g., 1-8 recesses) may additionally or alternatively be utilized. In the illustrated embodiment, the recesses 233 may have a V-notch cross-sectional shape. In other exemplary embodiments, cross-sectional shapes of the recess grooves may include, for example, buttress or half V-notch, radius tipped V-notch, semicircular, semielliptical, rectangular, trapezoidal, or a combination of these shapes.

In another embodiment, radially extending recesses may additionally or alternatively be provided in the annular surface of the fitting body that contacts the stroke resisting surface of the stroke resisting member. As shown in the enlarged partial view of FIG. 7A, in an alternative embodiment, an annular contacting surface 232*a* of the body 204*a* includes a plurality of radially extending recesses 233*a*. In the illustrated embodiment, the recesses 233*a* are grooves formed (e.g., machined, embossed, or molded) in the annular surface. While the recesses 233*a* are shown as extending entirely radially, or perpendicular to the central axis X of the fitting, in other embodiments, the radially extending recesses may extend partially circumferentially or tangentially across the annular surface 230*a* (e.g., spiral curved recesses, recesses angled with respect to a radial orientation, cross-hatched or knurled recesses, or zigzagged recesses), with the recesses extending from an inner diameter of the annular surface (i.e., an inner edge of the contacting surface 232*a* in contact with the annular surface 230*a* of the stroke resisting member 228*a*) to an outer diameter of the annular surface (i.e., an outer edge of the contacting surface 232*a* in contact with the annular surface 230*a* of the stroke resisting member 228*a*) to maintain a leak detection port. Note that as described herein, the annular contacting surface 232*a* of the body 204*a* need not extend across the entire shoulder of the body. Similar to the recesses 233 of FIG. 7, the radially extending recesses 233*a* may be sized and oriented to provide leak detection ports for the fitting when the nut 206*a* and body 204*a* are pulled up to the first relative axial position, such that fitting leakage may be detected at the leak detection ports, for example, by use of an electronic leak detection probe or application of a leak detection fluid.

Figure 7B:
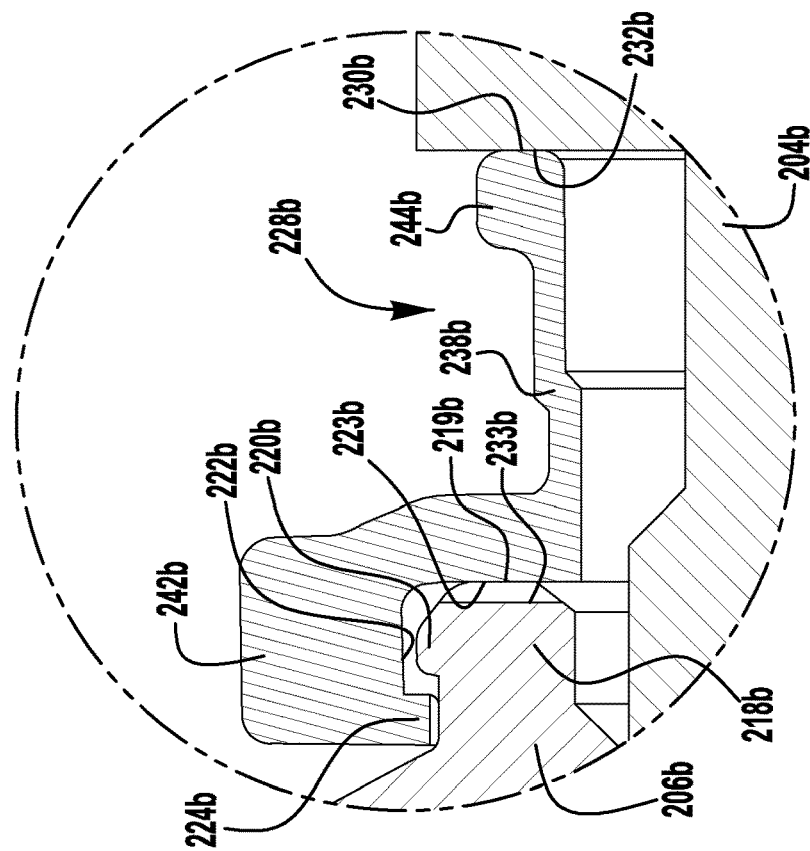
FIG. 7B is an enlarged partial cross-sectional view of another fitting according to an embodiment of one or more of the inventions herein, shown in a pulled-up position.
Figure 8:
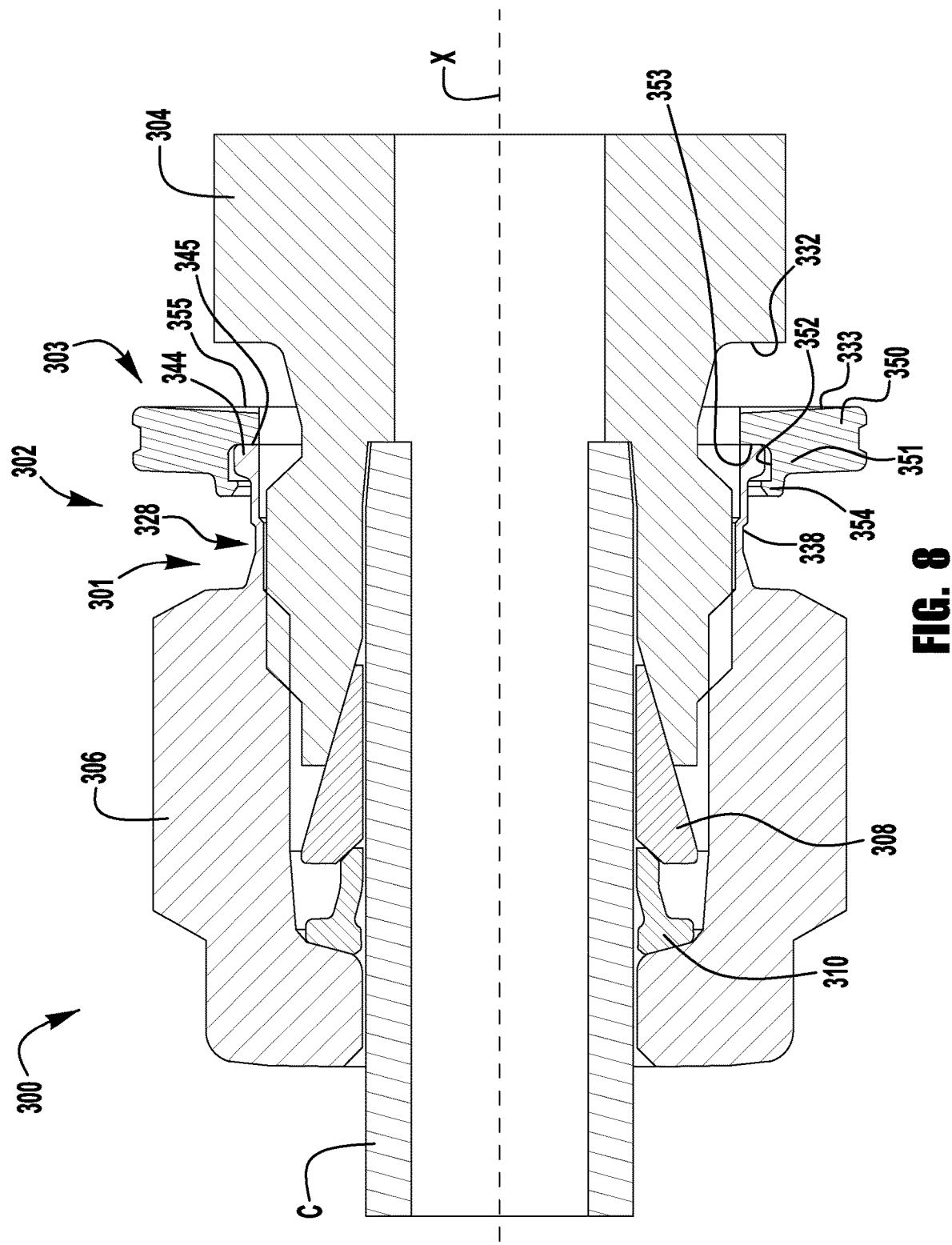
FIG. 8 is a longitudinal cross-sectional view of a fitting according to another embodiment of one or more of the inventions herein, shown in a finger tight position.

In another embodiment, radially extending recesses may additionally or alternatively be provided in the annular end surface of the cartridging nut extension that contacts an inner annular surface of the cartridging pocket of the stroke resisting member. As shown in the enlarged partial view of FIG. 7B, in an alternative embodiment, an annular extension surface 219*b* of the nut extension 218*b* includes a plurality of radially extending recesses 233*b*. In the illustrated embodiment, the recesses 233*b* are grooves formed (e.g., machined, embossed, or molded) in the annular surface 219*b*. While the recesses 233*b* are shown as extending entirely radially, or perpendicular to the central axis of the fitting, in other embodiments, the radially extending recesses may extend partially circumferentially or tangentially across the annular surface 223*b* (e.g., spiral curved recesses, recesses angled with respect to a radial orientation, cross-hatched or knurled recesses, or zigzagged recesses), with the recesses extending from an inner diameter of the annular surface (i.e., an inner edge of the surface 219*b* in contact with the annular surface 223*b* of the cartridging pocket 222*b*) to an outer diameter of the annular surface (i.e., an outer edge of the contacting surface 219*b* in contact with the annular surface 223*b* of the cartridging pocket 222*b*) to maintain a leak detection port. Note that as described herein, the annular contacting surface 223*b* of the cartridging pocket 222*b* need not extend across the entire interior of the pocket. Similar to the recesses 233, 233*a* of FIGS. 7 and 7A, the radially extending recesses 233*b* may be sized and oriented to provide leak detection ports for the fitting when the nut 206*b* and body 204*b* are pulled up to the first relative axial position, such that fitting leakage may be detected at the leak detection ports, for example, by use of an electronic leak detection probe or application of a leak detection fluid. As shown, the radially extending recesses 233*b* may be concealed from external view (e.g., by the proximal end ring portion 242*b* of the stroke resisting member 228*b*).

In still another embodiment, radially extending recesses may additionally or alternatively be provided in the inner annular surface of the cartridging pocket of the stroke resisting member that contacts an annular end surface of the cartridging nut extension. As shown in the enlarged partial view of FIG. 7C, in an alternative embodiment, an inner annular surface 223*c* of the cartridging pocket 222*c* includes one or more radially extending recesses 233*c*. In the illustrated embodiment, the recesses 233*c* are grooves formed (e.g., machined, embossed, or molded) in the annular surface 223*c*. While the recesses 233*c* are shown as extending entirely radially, or perpendicular to the central axis of the fitting, in other embodiments, the radially extending recesses may extend partially circumferentially or tangentially across the annular surface 223*c* (e.g., spiral curved recesses, recesses angled with respect to a radial orientation, cross-hatched or knurled recesses, or zigzagged recesses), with the recesses extending from an inner diameter of the annular surface (i.e., an inner edge of the surface 223*c* in contact with the annular surface 219*c* of the nut extension 218*c*) to an outer diameter of the annular surface (i.e., an outer edge of the surface 223*c* in contact with the annular surface 219*c* of the nut extension 218*c*) to maintain a leak detection port. Note that as described herein, the annular contacting surface 223*b* of the cartridging pocket 222*b* need not extend across the entire interior surface of the pocket. Similar to the recesses 233, 233*a* of FIGS. 7 and 7A, the radially extending recesses 233*c* may be sized and oriented to provide leak detection ports for the fitting when the nut 206*c* and body 204*c* are pulled up to the first relative axial position, such that fitting leakage may be detected at the leak detection ports, for example, by use of an electronic leak detection probe or application of a leak detection fluid. As shown, the radially extending recesses 233*c* may be concealed from external view (e.g., by the proximal end ring portion 242*c* of the stroke resisting member 228*c*).

In still other embodiments, axially engaging surfaces defining one or more leak detection ports may be provided with a fitting having a stroke resisting member that includes a first portion that is integral with one of the threaded fitting components (e.g., the fitting nut) and a second portion that is assembled with (e.g., cartridged with) the first portion of the stroke resisting member, for engagement with a surface of the other threaded fitting component (e.g., the fitting body) when the threaded fitting components are pulled up to a first relative axial position (e.g., corresponding to a complete pull-up of the fitting sufficient to effect conduit grip and seal). In one such example, a cartridged second portion of the stroke resisting member may function as an indicator ring (e.g., a stop collar) to provide a secondary pull-up indication.

FIGS. 8-10C illustrate exemplary embodiments of a fitting 300 having a stroke resisting torque collar 302 having a first portion 301 integral with a fitting nut 306, and a second portion 303 assembled with or cartridged to the first portion, similar to the embodiment of FIGS. 30 and 31 the above incorporated '110 Application. The first portion 301 of the torque collar 302 is generally in the form of an annular stroke resisting portion 328 including a distal end ring portion 344, and an axially compressible intermediate web portion 338 (which may be similar to one of the embodiments of the above incorporated '110 Application or the web portion 138 of the embodiments of FIGS. 1-4) connecting the distal ring portion 344 to the hex portion of the nut 306.

The second portion 303 of the torque collar 302 is generally in the form of an indicator ring 350 that is cartridged or otherwise assembled to the distal ring portion 344 of the stroke resisting portion 328, for example, using a cartridge structure such as the structure described hereinabove or other structure as needed. In the illustrated embodiments of FIGS. 8-10C, similar to several embodiments of the above incorporated '110 Application, the distal ring portion 344 of the stroke resisting portion 328 forms a cartridge feature extending radially outward from the web portion 338, and the indicator ring 350 includes a cartridge feature in the form of a recess or pocket 352 and a radially inward extending hook portion 354. Either or both of the distal ring portion 344 and the hook portion 354 are elastically deformable to allow the distal ring portion 344 to be inserted into the pocket 354 with the distal ring portion 344 and hook portion 354 snapping into interlocking or cartridging engagement.

The indicator ring 350 includes an annular stroke resisting surface 355 that engages a corresponding annular contacting surface 332 of the body 304 when the body and nut 306 are pulled up to the first relative axial position (e.g., corresponding to a complete pull-up of the fitting sufficient to effect conduit grip and seal by the ferrules 308, 310). An end surface 345 of the distal end 344 of the stroke resisting portion 328 is driven against an interior engaging surface 353 of the indicator ring pocket 352 (at a proximal end portion 351 of the indicator ring 350), rather than directly against a surface of the body 304. The indicator ring 350 therefore may be used as a gauge in which the indicator ring freely spins when it is not in contact with the contacting surface 332 of the body 304, and rotation of the indicator ring is prevented or impeded when in contact with the contacting surface 332 of the body 304 (e.g., in the first relative axial position).

Figure 9:
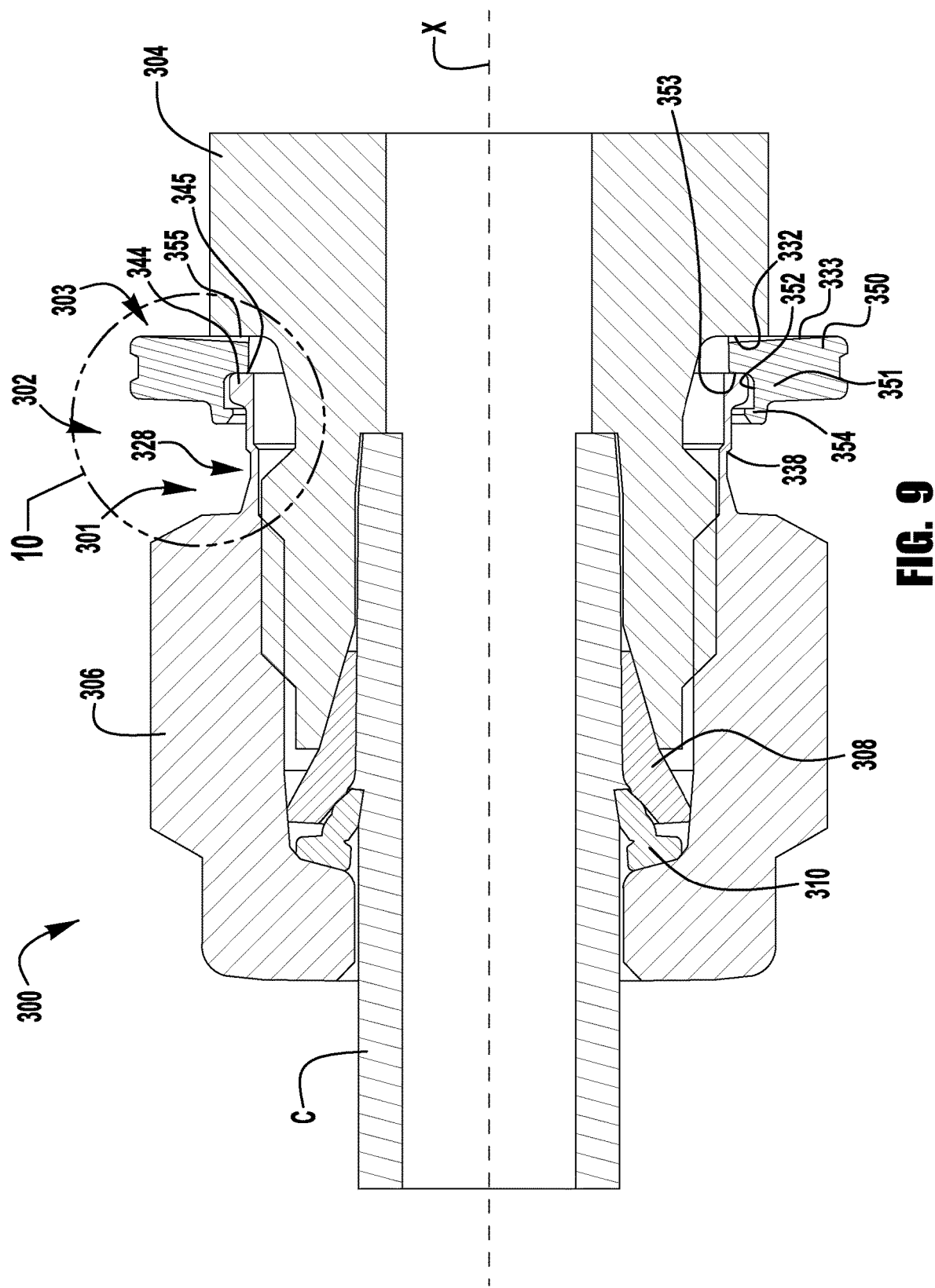
FIG. 9 is a longitudinal cross-sectional view of the fitting of FIG. 8, shown in a pulled-up position.
Figure 10C:
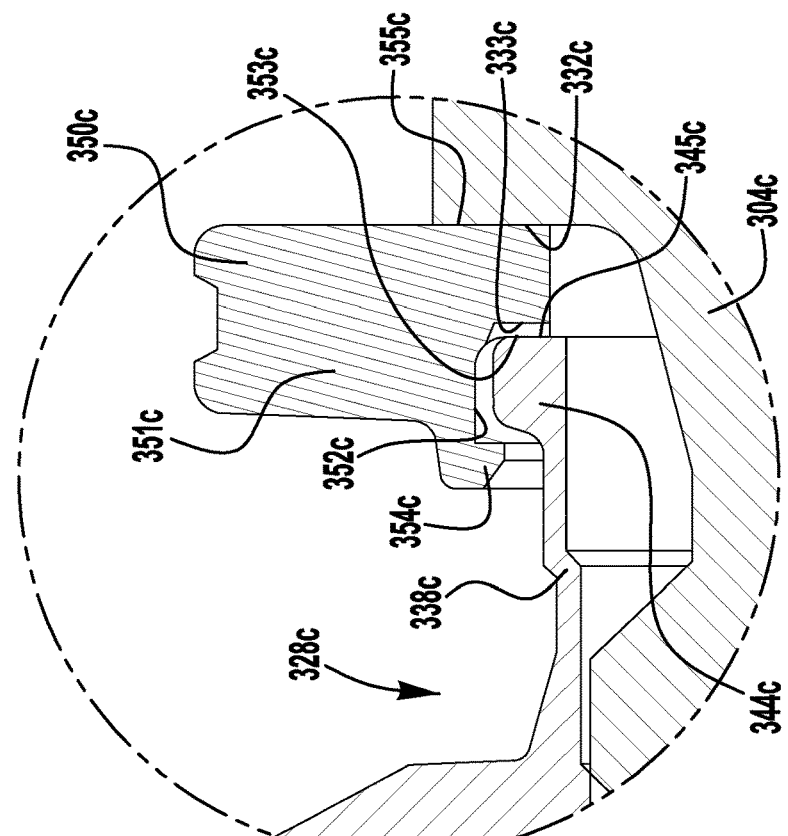
FIG. 10C is an enlarged partial cross-sectional view of another fitting according to an embodiment of one or more of the inventions herein, shown in a pulled-up position.
Figure 10B:
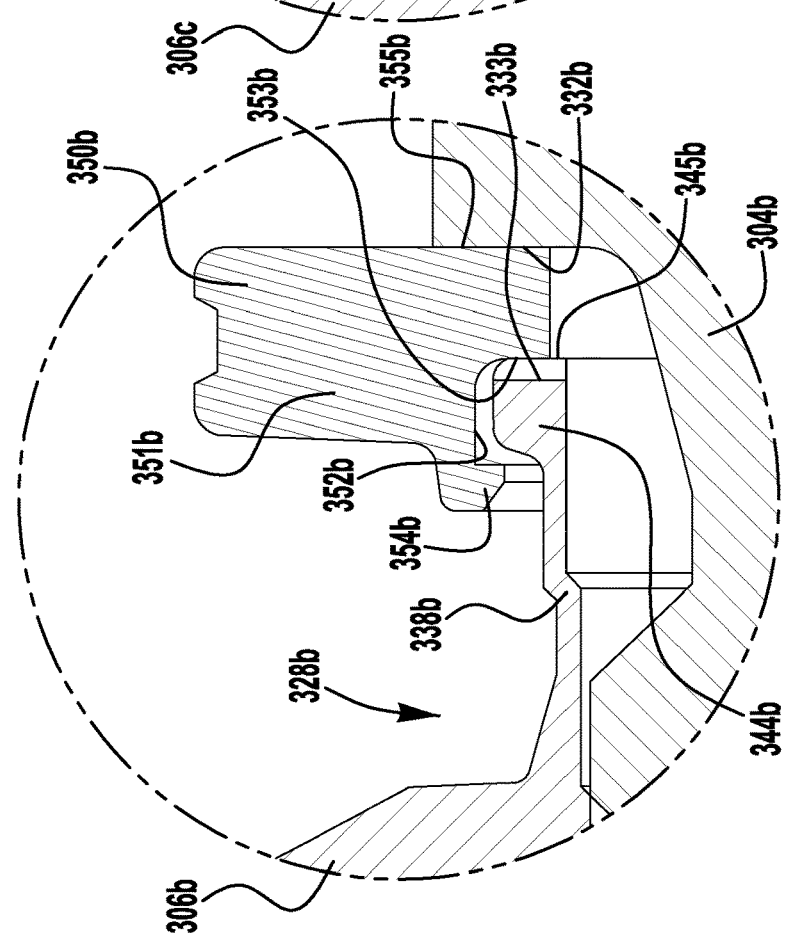
FIG. 10B is an enlarged partial cross-sectional view of another fitting according to an embodiment of one or more of the inventions herein, shown in a pulled-up position.
Figure 11:
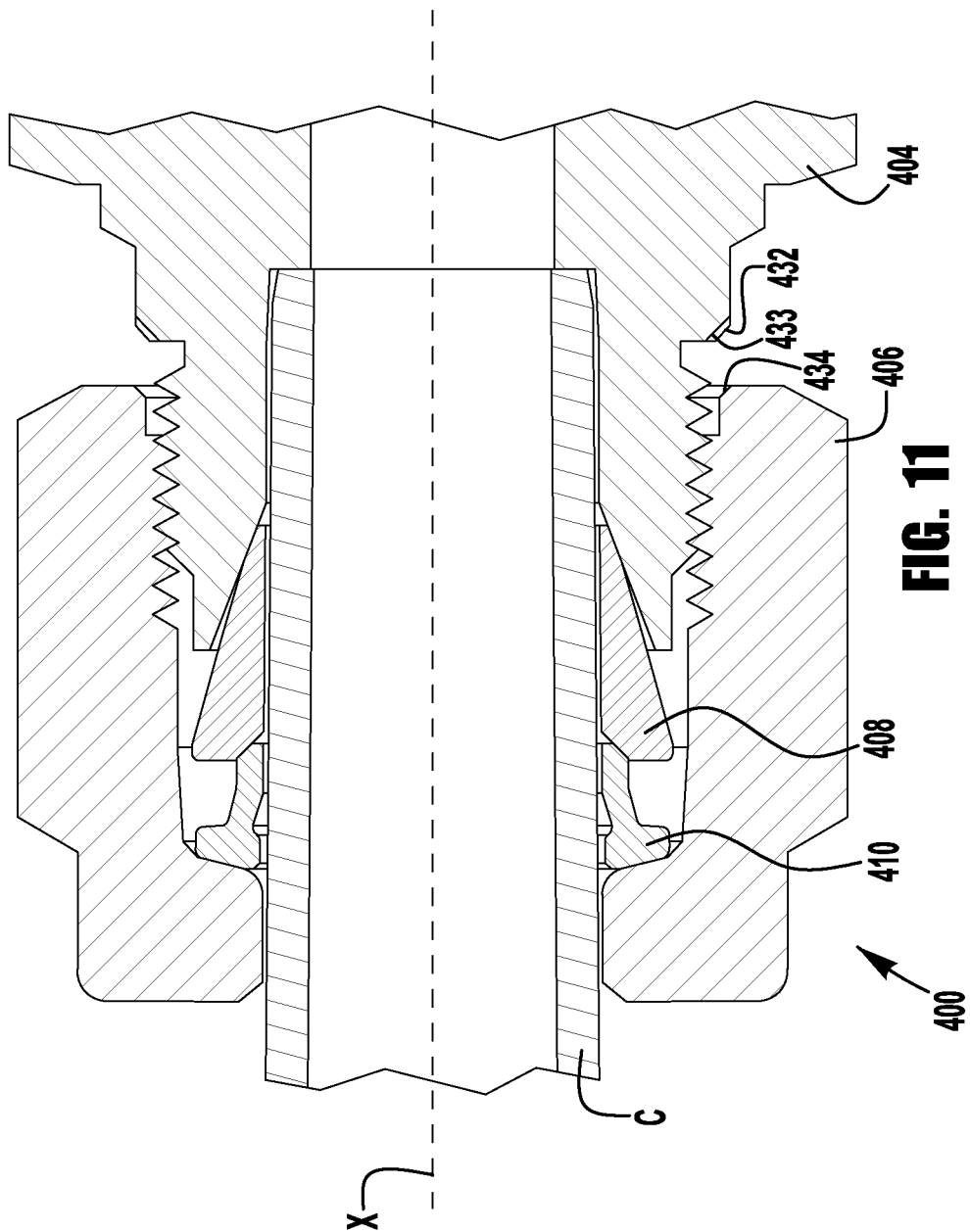
FIG. 11 is a longitudinal cross-sectional view of a fitting according to another embodiment of one or more of the inventions herein, shown in a finger tight position.

Once the distal annular stroke resisting surface 355 of the indicator ring 350 contacts the contacting annular surface 332 of the body 304 (as shown in FIG. 9), further relative rotation between the body 304 and the nut 306 applies an axial load or compression on the stroke resisting portion 328. As discussed in the above incorporated '110 Application, the controlled resistance to additional relative axial stroke between the body 304 and the nut 306, based on the configuration and geometry of the stroke resisting portion 328, may be used to allow for fitting pull-up by torque rather than pull-up by turns, with the stroke resisting member configured for at least partial plastic compression (e.g., bucking, collapsing) during pull-up so that pull-up by torque may also be used on remakes.

In one embodiment, as best shown in FIG. 10, the distal annular surface 355 of the indicator ring 350 includes one or more radially extending recesses 333. In the illustrated embodiment, the recesses 333 are grooves formed (e.g., machined, embossed, or molded) in the annular surface. While the recesses 333 are shown as extending entirely radially, or perpendicular to the central axis X of the fitting 300, in other embodiments, the radially extending recesses may extend partially circumferentially or tangentially across the annular surface 355 (e.g., spiral curved recesses, recesses angled with respect to a radial orientation, cross-hatched or knurled recesses, or zigzagged recesses), with the recesses extending from an inner diameter of the annular surface (i.e., an inner edge of the surface 355 in contact with the annular surface 332 of the body 304) to an outer diameter of the annular surface (i.e., an outer edge of the surface 355 in contact with the annular surface 332 of the body 304) to maintain a leak detection port. Note that as described herein, the distal annular surface 355 of the indicator ring 350 need not extend across the entire end face of the indicator ring 350.

The radially extending recesses 333 may be sized and oriented to provide leak detection ports for the fitting 300 when the nut 306 and body 304 are pulled up to the first relative axial position, such that fitting leakage (e.g., leakage past the ferrules 308, 310 into the normally non-wetted interior volume of the fitting 200) may be detected at the leak detection ports, for example, by use of an electronic leak detection probe or application of a leak detection fluid. As such, the recesses 333 may be sized for visual identification by the user (e.g., a maximum width of about 0.004" to about 0.030", or about 0.010", and a depth of about 0.004" to about 0.030", or about 0.010"), and may be oriented to ensure ease of access by a user (e.g., 4-6 recesses evenly spaced around the circumference of the indicator ring 350). Other sizes, shapes, and numbers of recesses (e.g., 1-8 recesses) may additionally or alternatively be utilized. In the illustrated embodiment, the recesses 333 may have a V-notch cross-sectional shape. In other exemplary embodiments, cross-sectional shapes of the recess grooves may include, for example, buttress or half V-notch, radius tipped V-notch, semicircular, semielliptical, rectangular, trapezoidal, or a combination of these shapes.

In another embodiment, radially extending recesses may additionally or alternatively be provided in the annular surface of the fitting body that contacts the stroke resisting surface of the stroke resisting member. As shown in the enlarged partial view of FIG. 10A, in an alternative embodiment, an annular contacting surface 332a of the body 304a includes a plurality of radially extending recesses 333a. In the illustrated embodiment, the recesses 333a are grooves formed (e.g., machined, embossed, or molded) in the annular surface. While the recesses 333a are shown as extending entirely radially, or perpendicular to the central axis of the fitting, in other embodiments, the radially extending recesses may extend partially circumferentially or tangentially across the annular surface 332a (e.g., spiral curved recesses, recesses angled with respect to a radial orientation, cross-hatched or knurled recesses, or zigzagged recesses), with the recesses extending from an inner diameter of the annular surface (i.e., an inner edge of the surface 332a in contact with the annular surface 355a of the indicator ring 350a) to an outer diameter of the annular surface (i.e., an outer edge of the surface 332a in contact with the annular surface 355a of the indicator ring 350a) to maintain a leak detection port. Note that as described herein, the annular contacting surface 332a of the body 304a need not extend across the entire shoulder of the body. Similar to the recesses 333 of FIG. 10, the radially extending recesses 233a may be sized and oriented to provide leak detection ports for the fitting when the nut 306a and body 304a are pulled up to the first relative axial position, such that fitting leakage may be detected at the leak detection ports, for example, by use of an electronic leak detection probe or application of a leak detection fluid.

In another embodiment, radially extending recesses may additionally or alternatively be provided in the annular end surface of the stroke resisting portion that contacts an inner annular surface of the cartridging pocket of the indicator ring. As shown in the enlarged partial view of FIG. 10B, in an alternative embodiment, an annular end surface 345b of the distal ring portion 344b includes a plurality of radially extending recesses 333b. In the illustrated embodiment, the recesses 333b are grooves formed (e.g., machined, embossed, or molded) in the annular surface 345b. While the recesses 333b are shown as extending entirely radially, or perpendicular to the central axis of the fitting, in other embodiments, the radially extending recesses may extend partially circumferentially or tangentially across the annular surface 345b (e.g., spiral curved recesses, recesses angled with respect to a radial orientation, cross-hatched or knurled recesses, or zigzagged recesses), with the recesses extending from an inner diameter of the annular surface (i.e., an inner edge of the surface 345b in contact with the annular surface 353b of the cartridging pocket 352b) to an outer diameter of the annular surface (i.e., an outer edge of the surface 345b in contact with the annular surface 353b of the cartridging pocket 352b) to maintain a leak detection port. Note that as described herein, the annular contacting surface 353b of the cartridging pocket 352b need not extend across the entire interior end surface of the pocket. Similar to the recesses 333, 333a of FIGS. 10 and 10A, the radially extending recesses 333b may be sized and oriented to provide leak detection ports for the fitting when the nut 306b and body 304b are pulled up to the first relative axial position, such that fitting leakage may be detected at the leak detection ports, for example, by use of an electronic leak detection probe or application of a leak detection fluid. As shown, the radially extending recesses 333b may be concealed from external view (e.g., by the proximal end portion 351b of the indicator ring 350b).

In still another embodiment, radially extending recesses may additionally or alternatively be provided in the inner annular surface of the cartridging pocket of the indicator ring that contacts an annular end surface of the cartridging nut extension. As shown in the enlarged partial view of FIG. 10C, in an alternative embodiment, an inner annular surface 353c of the cartridging pocket 352c includes one or more radially extending recesses 333c. In the illustrated embodiment, the recesses 333c are grooves formed (e.g., machined, embossed, or molded) in the annular surface 353c. While the recesses 333c are shown as extending entirely radially, or perpendicular to the central axis of the fitting, in other embodiments, the radially extending recesses may extend partially circumferentially or tangentially across the annular surface 353c (e.g., spiral curved recesses, recesses angled with respect to a radial orientation, cross-hatched or knurled recesses, or zigzagged recesses), with the recesses extending from an inner diameter of the annular surface (i.e., an inner edge of the surface 353c in contact with the annular surface 345c of the distal ring portion 344c) to an outer diameter of the annular surface (i.e., an outer edge of the surface 353c in contact with the annular surface 345c of the distal ring portion 344c) to maintain a leak detection port. Note that as described herein, the annular contacting surface 345c of the distal ring portion 344c need not extend across the entire end face of the distal ring portion. Similar to the recesses 333, 333a of FIGS. 10 and 10A, the radially extending recesses 333c may be sized and oriented to provide leak detection ports for the fitting when the nut 306c and body 304c are pulled up to the first relative axial position, such that fitting leakage may be detected at the leak detection ports, for example, by use of an electronic leak detection probe or application of a leak detection fluid. As shown, the radially extending recesses 333c may be concealed from external view (e.g., by the proximal end portion 351c of the indicator ring 350c).

In still other embodiments, axially engaging surfaces defining one or more leak detection ports may be provided with a fitting having a stroke resisting arrangement that includes an outward facing wedge surface that engages an inward facing taper surface that is axially pressed against the wedge surface when first and second fitting components (e.g., threaded body and nut) are pulled up to a first relative axial position, to significantly resist further axial advance of the fitting components, while allowing additional axial stroke during subsequent remakes. This contact produces a distinct and optionally sharp increase in torque that can be either sensed by the assembler or that will allow a torque wrench to be used to make up the fitting, both for initial installation and for subsequent remakes.

In some embodiments, an outward facing wedge surface is disposed on, or integral with, one of the first and second fitting components (e.g., a threaded fitting body), and an inward facing taper surface is disposed on, or integral with, the other of the first and second fitting components (e.g., a threaded fitting nut). Examples of fittings with integral "dynamic wedge" stroke resisting portions is described in the above incorporated '481 Patent (see FIGS. 4-6, 12, and 14).

Figure 12:
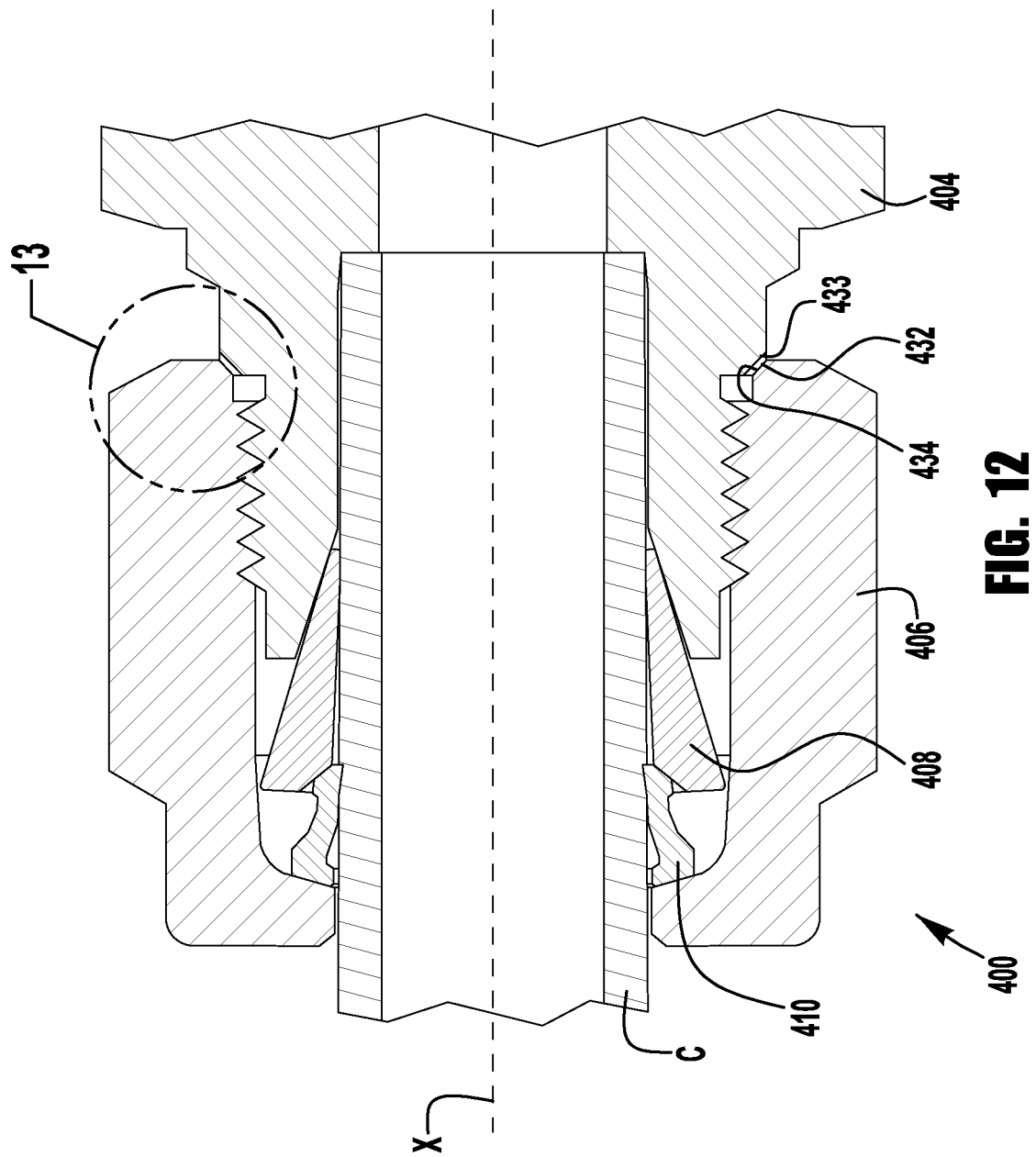
FIG. 12 is a longitudinal cross-sectional view of the fitting of FIG. 11, shown in a pulled-up position.

FIGS. 11-13A illustrate exemplary embodiments of a fitting 400 having a threaded fitting body 404 defining an annular stroke resisting wedge surface 432, and a threaded fitting nut 406 defining a corresponding annular taper surface 434 that engages the wedge surface 432 when the nut and body are pulled up to a first relative axial position (e.g., corresponding to a complete pull-up of the fitting sufficient to effect conduit grip and seal). Once the wedge surface 432 engages the taper surface 434 (as shown in FIG. 12), further relative rotation between the body 404 and the nut 406 applies an axial load or compression on the body 404 and nut 406. As discussed in the above incorporated '481 Patent, the controlled resistance to additional relative axial stroke between the body 404 and the nut 406 may be used to allow for fitting pull-up by torque rather than pull-up by turns, with the stroke resisting member configured for at least partial plastic compression (e.g., due to radially outward flaring or expansion of the nut 406, radially inward compression of the body 404, plastic deformation such as creep at the engaging surfaces 432, 434, or any combination thereof) during pull-up so that pull-up by torque may also be used on remakes.

Figure 13A:
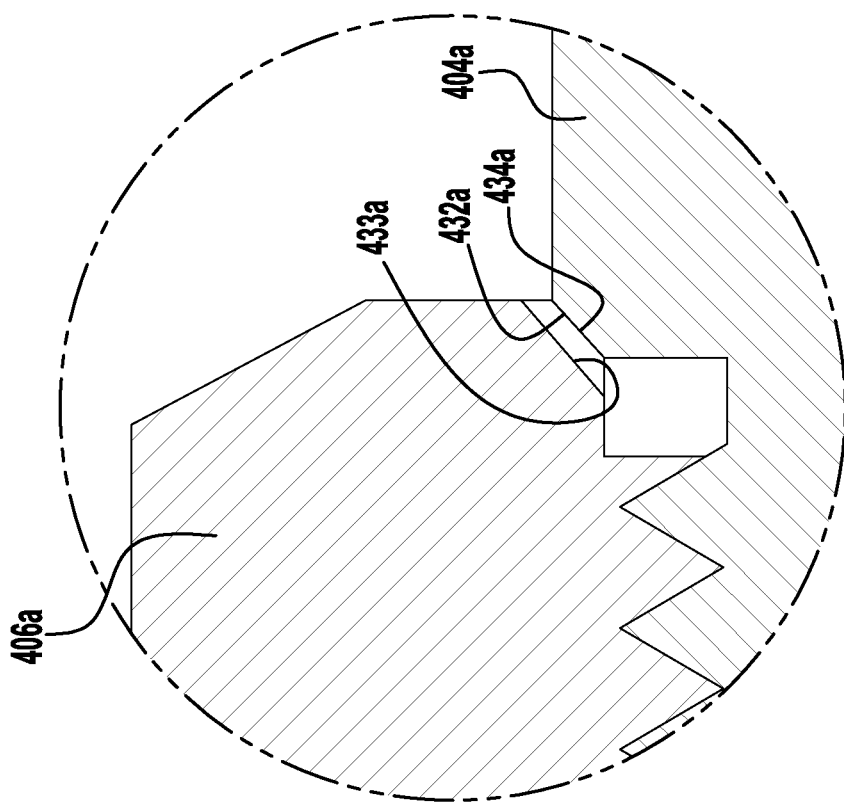
FIG. 13A is an enlarged partial cross-sectional view of another fitting according to an embodiment of one or more of the inventions herein, shown in a pulled-up position.
Figure 13:
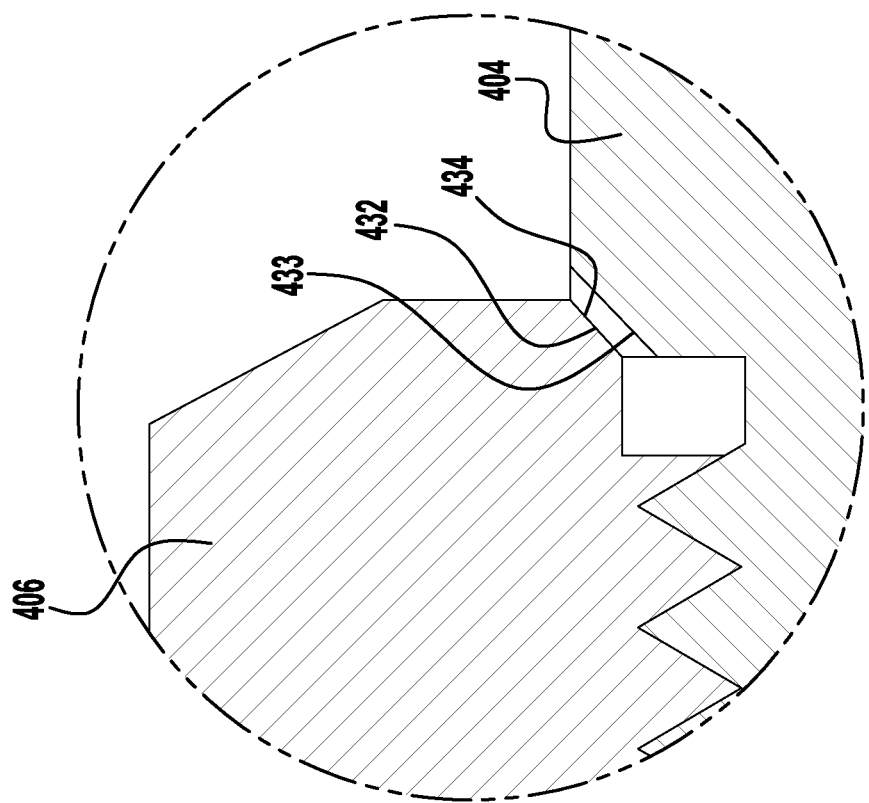
FIG. 13 is an enlarged illustration of the circled portion of FIG. 12.
Figure 14:
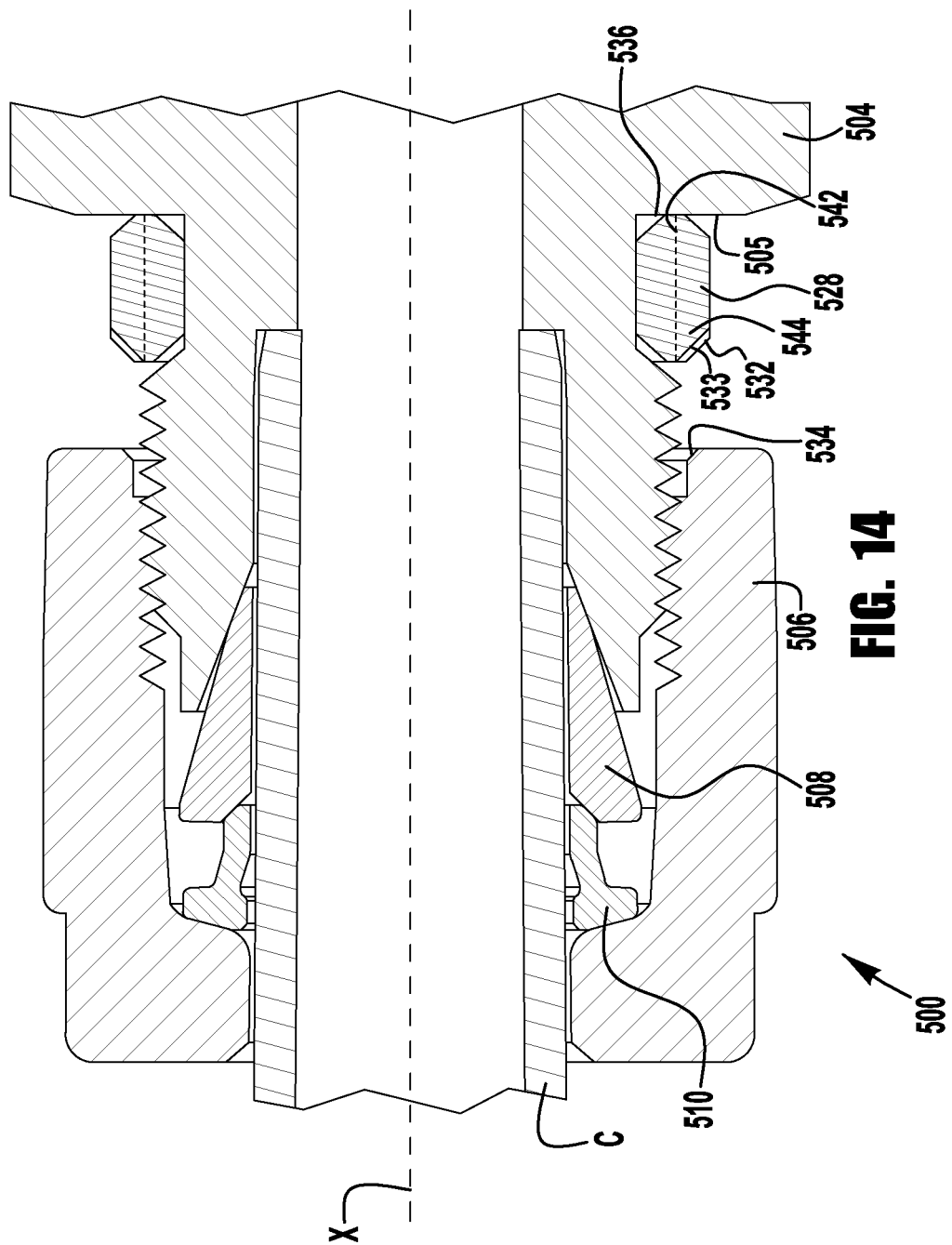
FIG. 14 is a longitudinal cross-sectional view of a fitting according to another embodiment of one or more of the inventions herein, shown in a finger tight position.

In one embodiment, as best shown in FIG. 13, the wedge surface 432 of the body 404 includes one or more radially extending recesses 433. In the illustrated embodiment, the recesses 433 are grooves formed (e.g., machined, embossed, or molded) in the wedge surface. While the recesses 433 are shown as extending along lines intersecting the central axis X of the fitting 400, in other embodiments, the radially extending recesses may extend partially circumferentially or tangentially across the annular wedge surface 432 (e.g., spiral curved recesses, recesses angled with respect to a radial orientation, cross-hatched or knurled recesses, or zigzagged recesses), with the recesses extending from an inner diameter of the annular surface (i.e., an inner edge of the surface 432 in contact with the taper surface 434 of the nut 406) to an outer diameter of the annular surface (i.e., an outer edge of the surface 432 in contact with the taper surface 434 of the nut 406) to maintain a leak detection port. Note that as described herein, the stroke resisting wedge surface 432 of the body 404 need not extend across the entire chamfered shoulder of the body 404.

The radially extending recesses 433 may be sized and oriented to provide leak detection ports for the fitting 400 when the nut 406 and body 404 are pulled up to the first relative axial position, such that fitting leakage (e.g., leakage past the ferrules 408, 410 into the normally non-wetted interior volume of the fitting 400) may be detected at the leak detection ports, for example, by use of an electronic leak detection probe or application of a leak detection fluid. As such, the recesses 433 may be sized for visual identification by the user (e.g., a maximum width of about 0.004" to about 0.030", or about 0.010", and a depth of about 0.004" to about 0.030", or about 0.010"), and may be oriented to ensure ease of access by a user (e.g., 4-6 recesses evenly spaced around the circumference of the body 404). Other sizes, shapes, and numbers of recesses (e.g., 1-8 recesses) may additionally or alternatively be utilized. In the illustrated embodiment, the recesses 433 may have a V-notch cross-sectional shape. In other exemplary embodiments, cross-sectional shapes of the recess grooves may include, for example, buttress or half V-notch, radius tipped V-notch, semicircular, semielliptical, rectangular, trapezoidal, or a combination of these shapes.

In another embodiment, radially extending recesses may additionally or alternatively be provided in the annular taper surface of the fitting nut that contacts the wedge surface of the fitting body. As shown in the enlarged partial view of FIG. 13A, in an alternative embodiment, an annular taper surface 434a of the nut 406a includes a plurality of radially extending recesses 433a. In the illustrated embodiment, the recesses 433a are grooves formed (e.g., machined, embossed, or molded) in the annular surface. While the recesses 433a are shown as extending along lines intersecting the central axis X of the fitting 400, in other embodiments, the radially extending recesses may extend partially circumferentially or tangentially across the annular taper surface 434a (e.g., spiral curved, recesses, recesses angled with respect to a radial orientation, cross-hatched or knurled recesses, or zigzagged recesses), with the recesses extending from an inner diameter of the annular surface (i.e., an inner edge of the surface 434a in contact with the wedge surface 432a of the body 404a) to an outer diameter of the annular surface (i.e., an outer edge of the surface 434a in contact with the wedge surface 432a of the body 404a) to maintain a leak detection port. Note that as described herein, the annular contacting surface 434a of the nut 406a need not extend across the entire interior chamfer of the nut. Similar to the recesses 433 of FIG. 13, the radially extending recesses 433a may be sized and oriented to provide leak detection ports for the fitting when the nut 406a and body 404a are pulled up to the first relative axial position, such that fitting leakage may be detected at the leak detection ports, for example, by use of an electronic leak detection probe or application of a leak detection fluid.

In other embodiments, an outward facing wedge surface is disposed on a stroke resisting member that is assembled with one of the threaded fitting components (e.g., the fitting body) for engagement with a surface of the other threaded fitting component (e.g., the fitting nut) when the threaded fitting components are pulled up to a first relative axial position (e.g., corresponding to a complete pull-up of the fitting sufficient to effect conduit grip and seal by the ferrules).

FIGS. 14-16C illustrate exemplary embodiments of a fitting 500 having a stroke resisting member 528 assembled with a fitting body 504, similar to several of the embodiments of the above incorporated '481 Patent (see, e.g., the embodiments of FIGS. 1-3, 7-11, and 13 of the '481 Patent). The stroke resisting member 528 including a first or proximal end portion 542 abutting a shoulder surface 505 of the body 504, and a second or distal end portion 544 defining an annular stroke resisting wedge surface 532. In one embodiment, as shown, both ends of the stroke resisting member may be provided with annular wedge surfaces, for example, to allow for reversible installation of the stroke resisting member on the fitting body. In other embodiments, the stroke resisting member may be non-reversible, for example, to provide additional load bearing material on a body engaging end portion of the stroke resisting member (see, e.g., the embodiment of FIGS. 9 and 10 of the '481 Patent).

Many different arrangements may be utilized to assemble the stroke resisting member 528 with the fitting body 504, including, for example, female threads on the stroke resisting member providing for threaded installation with the fitting body, or a split ring stroke resisting member configured for snap fit installation over the fitting body neck. In other embodiments, the stroke resisting member may be loosely installed over the fitting body, such that the stroke resisting member is axially captured between the fitting body and nut.

Figure 15:
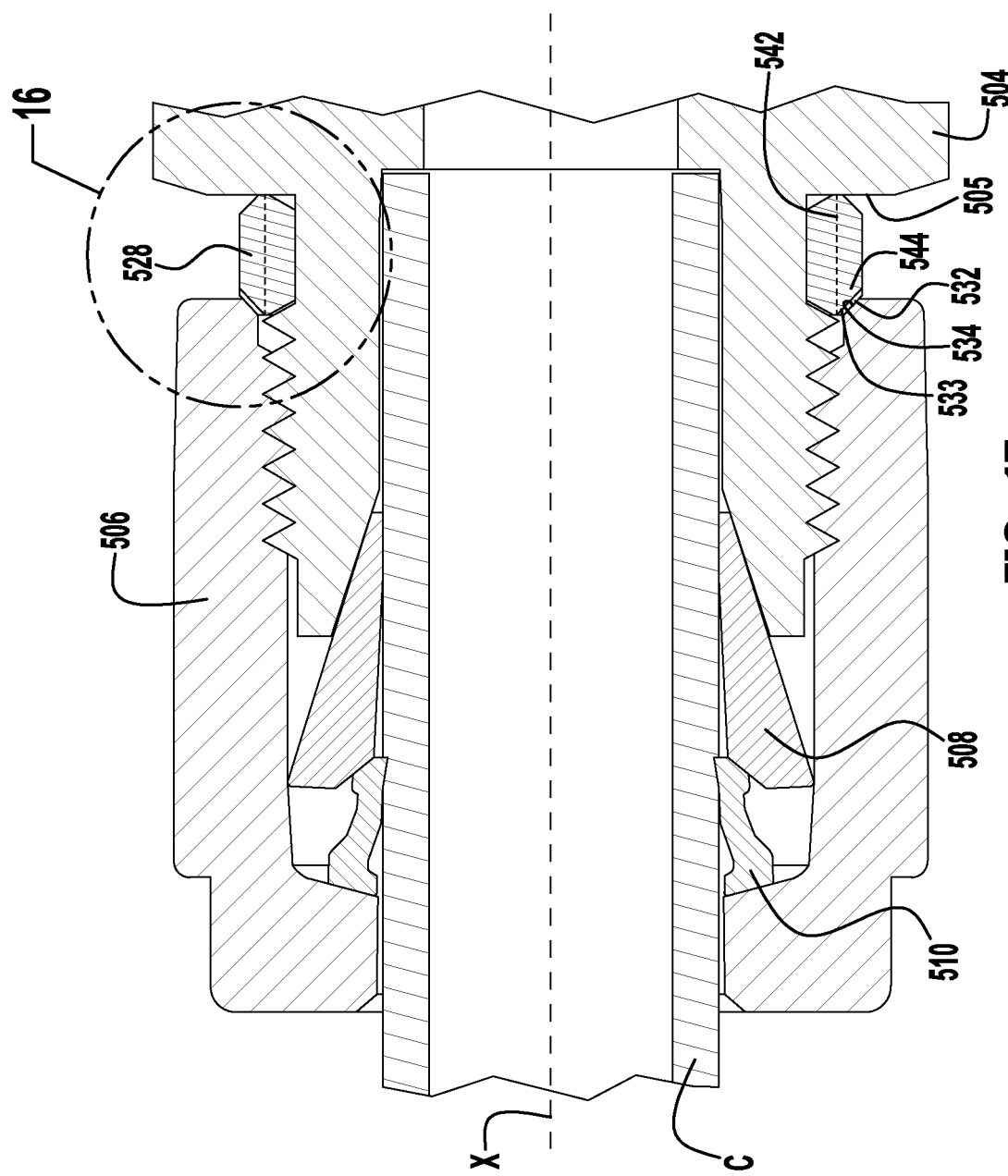
FIG. 15 is a longitudinal cross-sectional view of the fitting of FIG. 14, shown in a pulled-up position.

Once the stroke resisting wedge surface 532 of the stroke resisting member 528 contacts a contacting annular taper surface 534 of the nut 506 (as shown in FIG. 15), further relative rotation between the body 504 and the nut 506 applies an axial load or compression on the stroke resisting member 528 and nut 506. As discussed in the above incorporated '481 Patent, the controlled resistance to additional relative axial stroke between the stroke resisting member 528 and the nut 506 may be used to allow for fitting pull-up by torque rather than pull-up by turns, with the stroke resisting member configured for at least partial plastic compression (e.g., due to radially outward flaring or expansion of the nut 506, radially inward compression of the stroke resisting member 528, plastic deformation such as creep at the engaging surfaces 532, 534, or any combination thereof) during pull-up so that pull-up by torque may also be used on remakes.

In one embodiment, as best shown in FIG. 16, the annular wedge surface 532 of the stroke resisting member 528 includes one or more radially extending recesses 533. In the illustrated embodiment, the recesses 533 are grooves formed (e.g., machined, embossed, or molded) in the annular surface. While the recesses 533 are shown as extending along lines intersecting the central axis X of the fitting 500, in other embodiments, the radially extending recesses may extend partially circumferentially or tangentially across the annular wedge surface 532 (e.g., spiral curved recesses, recesses angled with respect to a radial orientation, cross-hatched or knurled recesses, or zigzagged recesses), with the recesses extending from an inner diameter of the annular surface (i.e., an inner edge of the surface 532 in contact with the taper surface 534 of the nut 506) to an outer diameter of the annular surface (i.e., an outer edge of the surface 532 in contact with the taper surface 534 of the nut 506) to maintain a leak detection port. Note that as described herein, the annular wedge surface 532 of the stroke resisting member 528 need not extend across the entire outer chamfered face of the stroke resisting member 528.

The radially extending recesses 533 may be sized and oriented to provide leak detection ports for the fitting 500 when the nut 506 and body 504 are pulled up to the first relative axial position, such that fitting leakage (e.g., leakage past the ferrules 508, 510 into the normally non-wetted interior volume of the fitting 500) may be detected at the leak detection ports, for example, by use of an electronic leak detection probe or application of a leak detection fluid. As such, the recesses 533 may be sized for visual identification by the user (e.g., a maximum width of about 0.004" to about 0.030", or about 0.010", and a depth of about 0.004" to about 0.030", or about 0.010"), and may be oriented to ensure ease of access by a user (e.g., 4-6 recesses evenly spaced around the circumference of the stroke resisting member 528). Other sizes, shapes, and numbers of recesses (e.g., 1-8 recesses) may additionally or alternatively be utilized. In the illustrated embodiment, the recesses 533 may have a V-notch cross-sectional shape. In other exemplary embodiments, cross-sectional shapes of the recess grooves may include, for example, buttress or half V-notch, radius tipped V-notch, semicircular, semielliptical, rectangular, trapezoidal, or a combination of these shapes.

In another embodiment, radially extending recesses may additionally or alternatively be provided in the annular taper surface of the fitting nut that contacts the stroke resisting wedge surface of the stroke resisting member. As shown in the enlarged partial view of FIG. 16A, in an alternative embodiment, an annular taper surface 532a of the nut 506a includes a plurality of radially extending recesses 533a. In the illustrated embodiment, the recesses 533a are grooves formed (e.g., machined, embossed, or molded) in the annular surface. While the recesses 533a are shown as extending along lines intersecting the central axis of the fitting, in other embodiments, the radially extending recesses may extend partially circumferentially or tangentially across the annular taper surface 534a (e.g., spiral curved recesses, recesses angled with respect to a radial orientation, cross-hatched or knurled recesses, or zigzagged recesses), with the recesses extending from an inner diameter of the annular surface (i.e., an inner edge of the surface 534a in contact with the wedge surface 532a of the stroke resisting member 528a) to an outer diameter of the annular surface (i.e., an outer edge of the surface 534a in contact with the wedge surface 532a of the stroke resisting member 528a) to maintain a leak detection port. Note that as described herein, the annular taper surface 534a of the nut 506a need not extend across the entire chamfered inner face of the nut 506a. Similar to the recesses 533 of FIG. 16, the radially extending recesses 533a may be sized and oriented to provide leak detection ports for the fitting when the nut 506a and body 504a are pulled up to the first relative axial position, such that fitting leakage may be detected at the leak detection ports, for example, by use of an electronic leak detection probe or application of a leak detection fluid.

In another embodiment, radially extending recesses may additionally or alternatively be provided in the annular proximal end surface of the stroke resisting member that contacts an annular surface of the body shoulder. As shown in the enlarged partial view of FIG. 16B, in an alternative embodiment, an annular proximal end surface 536b of the stroke resisting member 528b includes a plurality of radially extending recesses 533b. In the illustrated embodiment, the recesses 533b are grooves formed (e.g., machined, embossed, or molded) in the annular surface 536b. While the recesses 533b are shown as extending entirely radially, or perpendicular to the central axis of the fitting, in other embodiments, the radially extending recesses may extend partially circumferentially or tangentially across the annular surface 536b (e.g., spiral curved recesses, recesses angled with respect to a radial orientation, cross-hatched or knurled recesses, or zigzagged recesses), with the recesses extending from an inner diameter of the annular surface (i.e., an inner edge of the surface 536b in contact with the annular body shoulder surface 505b) to an outer diameter of the annular surface (i.e., an outer edge of the surface 536b in contact with the annular body shoulder surface 505b) to maintain a leak detection port. Note that as described herein, the annular body shoulder contacting surface 505b need not extend across the entire shoulder of the body. Similar to the recesses 533, 533a of FIGS. 16 and 16A, the radially extending recesses 533b may be sized and oriented to provide leak detection ports for the fitting when the nut 506b and body 504b are pulled up to the first relative axial position, such that fitting leakage may be detected at the leak detection ports, for example, by use of an electronic leak detection probe or application of a leak detection fluid.

In still another embodiment, radially extending recesses may additionally or alternatively be provided in the annular contacting surface of the body shoulder that contacts an annular proximal end surface of the stroke resisting member. As shown in the enlarged partial view of FIG. 16C, in an alternative embodiment, an annular body shoulder contacting surface 505c includes one or more radially extending recesses 533c. In the illustrated embodiment, the recesses 533c are grooves formed (e.g., machined, embossed, or molded) in the annular surface 505c. While the recesses 533c are shown as extending entirely radially, or perpendicular to the central axis of the fitting, in other embodiments, the radially extending recesses may extend partially circumferentially or tangentially across the annular surface 505c (e.g., spiral curved recesses, recesses angled with respect to a radial orientation, cross-hatched or knurled recesses, or zigzagged recesses), with the recesses extending from an inner diameter of the annular surface (i.e., an inner edge of the surface 505c in contact with the annular end surface 536c of the stroke resisting member 528c) to an outer diameter of the annular surface (i.e., an outer edge of the surface 505c in contact with the annular end surface 536c of the stroke resisting member 528c) to maintain a leak detection port. Similar to the recesses 533, 533a of FIGS. 16 and 16A, the radially extending recesses 533c may be sized and oriented to provide leak detection ports for the fitting when the nut 506c and body 504c are pulled up to the first relative axial position, such that fitting leakage may be detected at the leak detection ports, for example, by use of an electronic leak detection probe or application of a leak detection fluid.

In other embodiments, axially engaging surfaces defining one or more leak detection ports may be provided with a fitting having a stroke resisting arrangement that includes a radially extending, axially flexible flange disposed on a fitting component (e.g., threaded body or threaded nut) that engages an annular contacting surface of the fitting when the fitting component is pulled up with a mating fitting component (e.g., threaded nut or threaded body) to a first relative axial position, to significantly resist further axial advance of the fitting components, while allowing additional axial stroke during subsequent remakes. This contact produces a distinct and optionally sharp increase in torque that can be either sensed by the assembler or that will allow a torque wrench to be used to make up the fitting, both for initial installation and for subsequent remakes.

In some embodiments, a radially extending, axially flexible flange is disposed on one of the first and second fitting components (e.g., a threaded fitting body or a threaded fitting nut), and an annular contacting surface is disposed on the other of the first and second fitting components (e.g., a threaded fitting nut or a threaded fitting body). Examples of fittings with axially flexible stroke resisting flange portions are described in the above incorporated '878 Application (see FIG. 15A-17 of the '878 Application).

Figure 18:
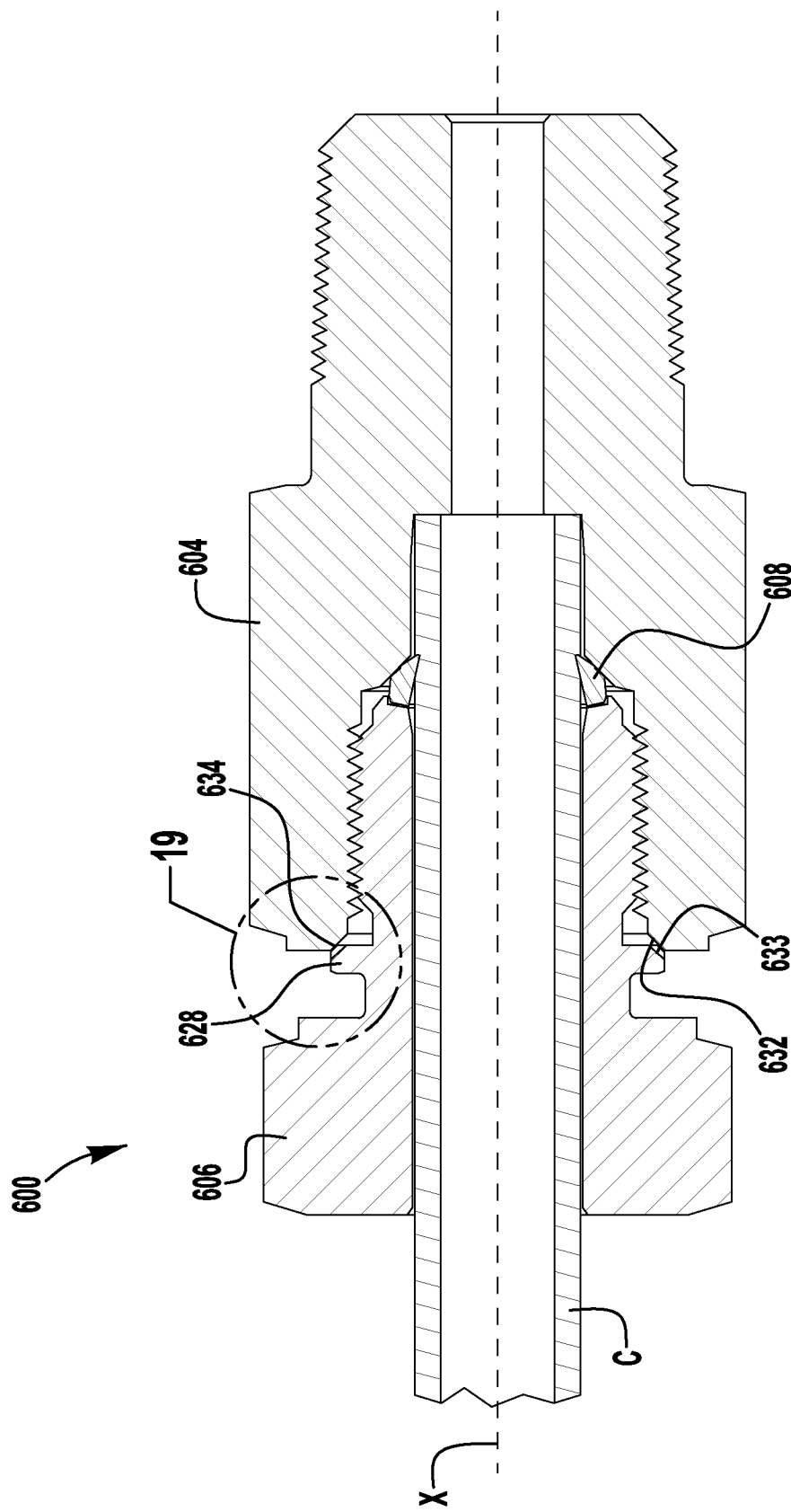
FIG. 18 is a longitudinal cross-sectional view of the fitting of FIG. 17, shown in a pulled-up position.
Figure 20:
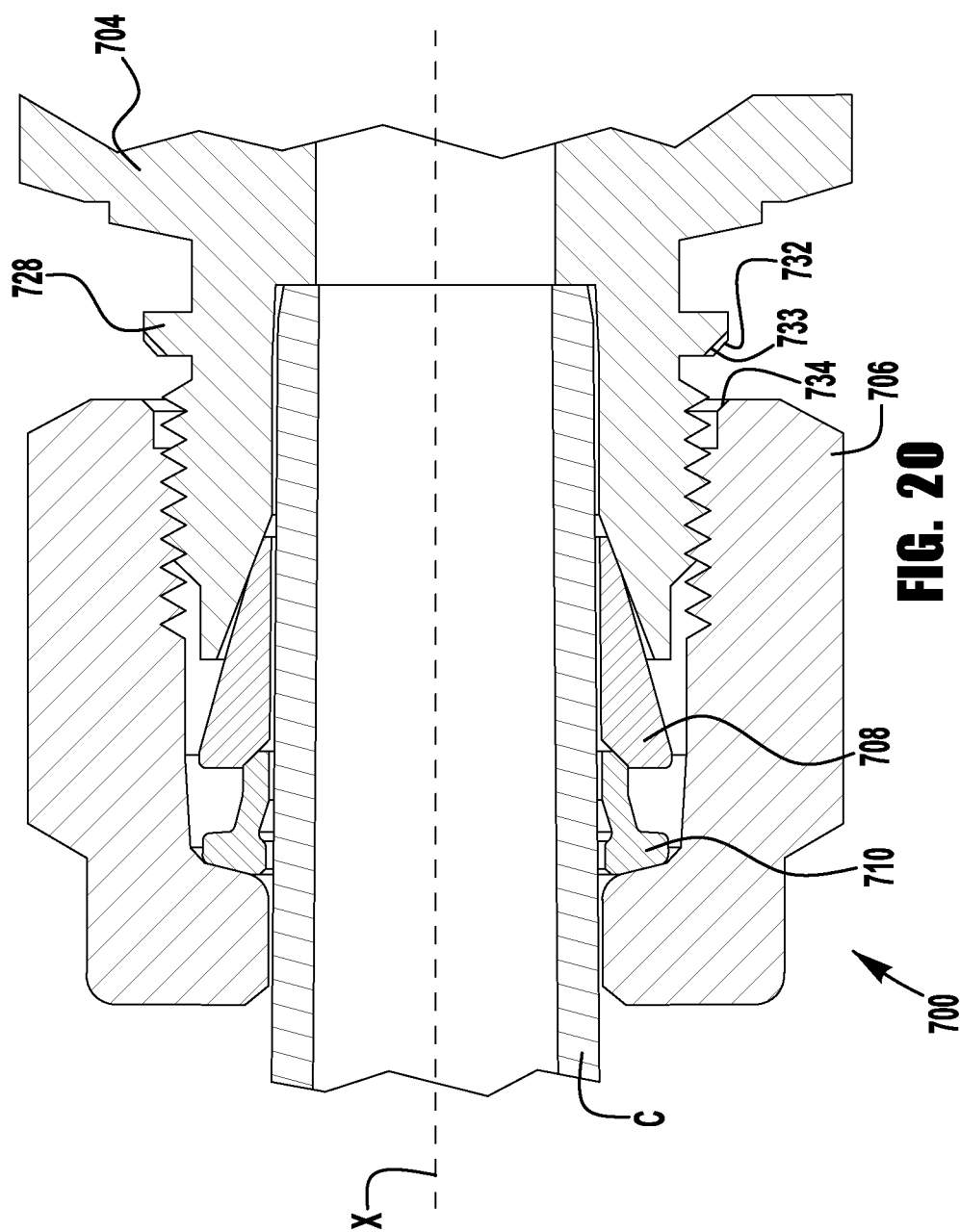
FIG. 20 is a longitudinal cross-sectional view of a fitting according to another embodiment of one or more of the inventions herein, shown in a finger tight position.

FIGS. 17-19A illustrate exemplary embodiments of a fitting 600 having a male threaded fitting nut 606 including a radially extending, axially flexible stroke resisting flange portion 628 defining an annular stroke resisting surface 634, and a female threaded fitting body 604 defining a corresponding annular contacting surface 632 that engages the stroke resisting surface 634 when the nut 606 and body 604 are pulled up to a first relative axial position (e.g., corresponding to a complete pull-up of the fitting sufficient to effect conduit grip and seal). In other embodiments (not shown), a fitting may include a female threaded nut and a male threaded body, similar to the embodiments described above. Once the stroke resisting surface 634 engages the contacting surface 632 (as shown in FIG. 18), further relative rotation between the body 604 and the nut 606 applies an axial load or compression on the body and nut. As discussed in the above incorporated '878 Application, the controlled resistance to additional relative axial stroke between the body 604 and the nut 606 may be used to allow for fitting pull-up by torque rather than pull-up by turns, with the stroke resisting portion configured for at least partial plastic compression (e.g., due to axial bending of the flange portion 628) during pull-up so that pull-up by torque may also be used on remakes. In the illustrated embodiments, the annular surfaces 634, 632 are mating tapered or frustoconical surfaces. In other embodiments, the annular surfaces may be provided at different contours and orientations, including, for example, substantially flat radial surfaces (i.e., perpendicular to the central axis X).

In one embodiment, as best shown in FIG. 19, the stroke resisting surface 634 of the nut flange 628 includes one or more radially extending recesses 633. In the illustrated embodiment, the recesses 633 are grooves formed (e.g., machined, embossed, or molded) in the stroke resisting surface 634. While the recesses 633 are shown as extending along lines intersecting the central axis X of the fitting 600, in other embodiments, the radially extending recesses may extend partially circumferentially or tangentially across the annular stroke resisting surface 634 (e.g., spiral curved recesses, recesses angled with respect to a radial orientation, cross-hatched or knurled recesses, or zigzagged recesses), with the recesses extending from an inner diameter of the annular surface (i.e., an inner edge of the surface 634 in contact with the contacting surface 632 of the body 604) to an outer diameter of the annular surface (i.e., an outer edge of the surface 634 in contact with the contacting surface 632 of the body 604) to maintain a leak detection port. Note that as described herein, the contacting surface 632 of the body 604 need not extend across the entire inner chamfered surface of the body.

The radially extending recesses 633 may be sized and oriented to provide leak detection ports for the fitting 600 when the nut 606 and body 604 are pulled up to the first relative axial position, such that fitting leakage (e.g., leakage past the single ferrule 608 into the normally non-wetted interior volume of the fitting 600) may be detected at the leak detection ports, for example, by use of an electronic leak detection probe or application of a leak detection fluid. As such, the recesses 633 may be sized for visual identification by the user (e.g., a maximum width of about 0.004" to about 0.030", or about 0.010", and a depth of about 0.004" to about 0.030", or about 0.010"), and may be oriented to ensure ease of access by a user (e.g., 4-6 recesses evenly spaced around the circumference of the nut flange 628). Other sizes, shapes, and numbers of recesses (e.g., 1-8 recesses) may additionally or alternatively be utilized. In the illustrated embodiment, the recesses 633 may have a V-notch cross-sectional shape. In other exemplary embodiments, cross-sectional shapes of the recess grooves may include, for example, buttress or half V-notch, radius tipped V-notch, semicircular, semielliptical, rectangular, trapezoidal, or a combination of these shapes.

In another embodiment, radially extending recesses may additionally or alternatively be provided in the annular contacting surface of the fitting body that contacts the stroke resisting surface of the nut flange. As shown in the enlarged partial view of FIG. 19A, in an alternative embodiment, an annular contacting surface 632a of the body 604a includes a plurality of radially extending recesses 633a. In the illustrated embodiment, the recesses 633a are grooves formed (e.g., machined, embossed, or molded) in the annular surface. While the recesses 633a are shown as extending along lines intersecting the central axis X of the fitting 600a, in other embodiments, the radially extending recesses may extend partially circumferentially or tangentially across the annular contacting surface 632a (e.g., spiral curved recesses, recesses angled with respect to a radial orientation, cross-hatched or knurled recesses, or zigzagged recesses), with the recesses extending from an inner diameter of the annular surface (i.e., an inner edge of the surface 632a in contact with the stroke resisting surface 634a of the nut flange 628a) to an outer diameter of the annular surface (i.e., an outer edge of the surface 632a in contact with the stroke resisting surface 634a of the nut flange 628a) to maintain a leak detection port. Note that as described herein, the stroke resisting surface 634a of the nut flange 628a need not extend across the entire outer chamfered surface of the nut flange. Similar to the recesses 633 of FIG. 18, the radially extending recesses 633a may be sized and oriented to provide leak detection ports for the fitting when the nut 606a and body 604a are pulled up to the first relative axial position, such that fitting leakage may be detected at the leak detection ports, for example, by use of an electronic leak detection probe or application of a leak detection fluid.

In other exemplary embodiments, a radially extending, axially flexible flange defining an annular stroke resisting surface is disposed on (e.g., integral to or assembled with) the fitting body, and an annular contacting surface is disposed on the fitting nut, with leak detection port defining recesses disposed on the stroke resisting surface and/or the contacting surface.

Figure 21:
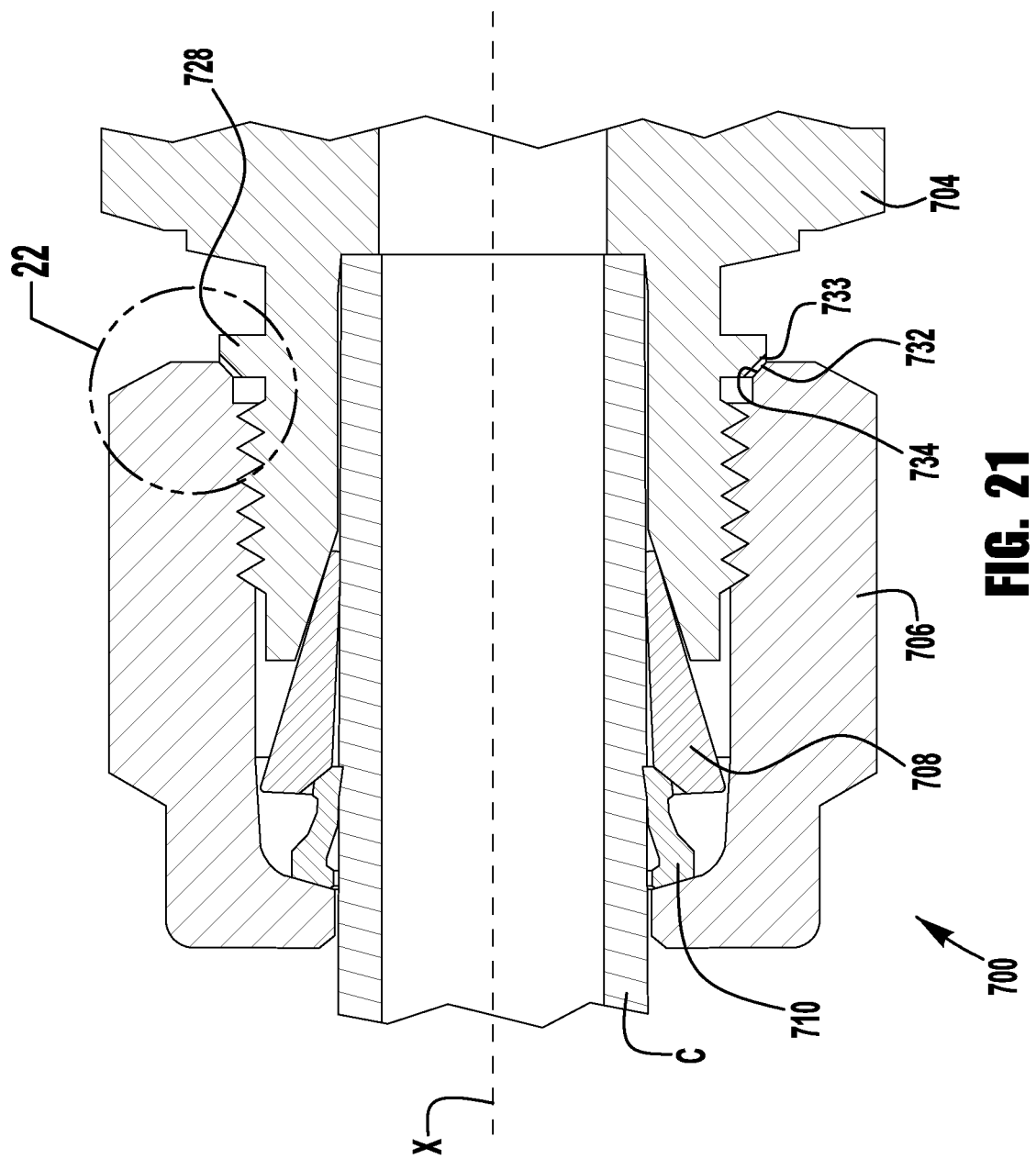
FIG. 21 is a longitudinal cross-sectional view of the fitting of FIG. 20, shown in a pulled-up position.

FIGS. 20-22A illustrate exemplary embodiments of a fitting 700 having a male threaded fitting body 706 including a radially extending, axially flexible stroke resisting flange portion 728 defining an annular stroke resisting surface 732, and a female threaded fitting nut 706 defining a corresponding annular contacting surface 734 that engages the stroke resisting surface 732 when the nut 706 and body 704 are pulled up to a first relative axial position (e.g., corresponding to a complete pull-up of the fitting sufficient to effect conduit grip and seal). Once the stroke resisting surface 732 engages the contacting surface 734 (as shown in FIG. 21), further relative rotation between the body 704 and the nut 706 applies an axial load or compression on the body and nut. As discussed in the above incorporated '878 Application, the controlled resistance to additional relative axial stroke between the body 704 and the nut 706 may be used to allow for fitting pull-up by torque rather than pull-up by turns, with the stroke resisting portion configured for at least partial plastic compression (e.g., due to axial bending of the flange portion 728) during pull-up so that pull-up by torque may also be used on remakes. In the illustrated embodiments, the annular surfaces 732, 734 are mating tapered or frustoconical surfaces. In other embodiments, the annular surfaces may be provided at different contours and orientations, including, for example, substantially flat radial surfaces (i.e., perpendicular to the central axis X).

Figure 22A:
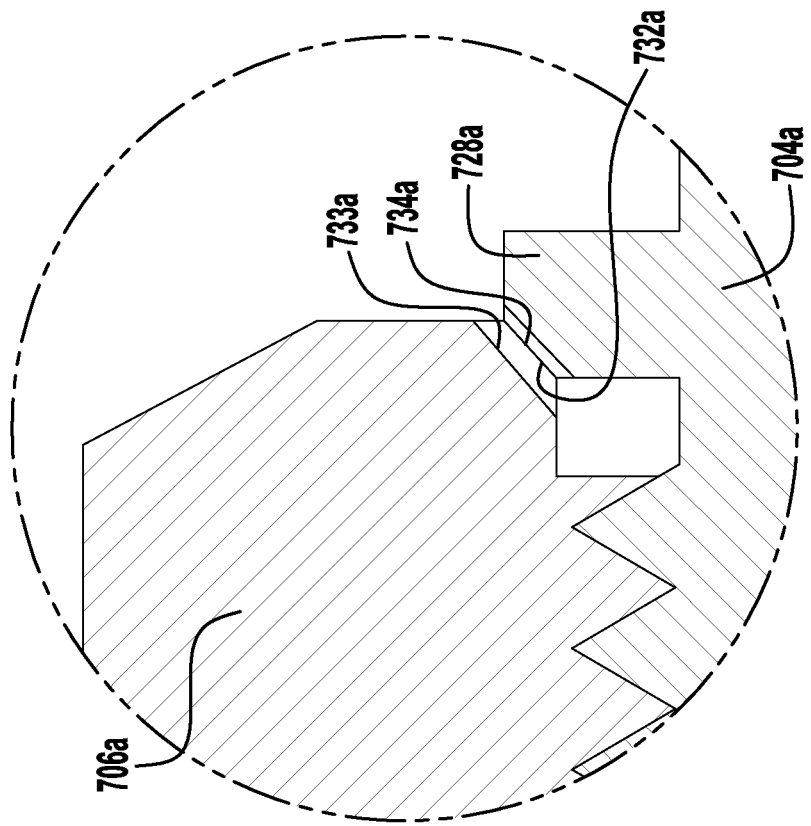
FIG. 22A is an enlarged partial cross-sectional view of another fitting according to an embodiment of one or more of the inventions herein, shown in a pulled-up position.
Figure 22:
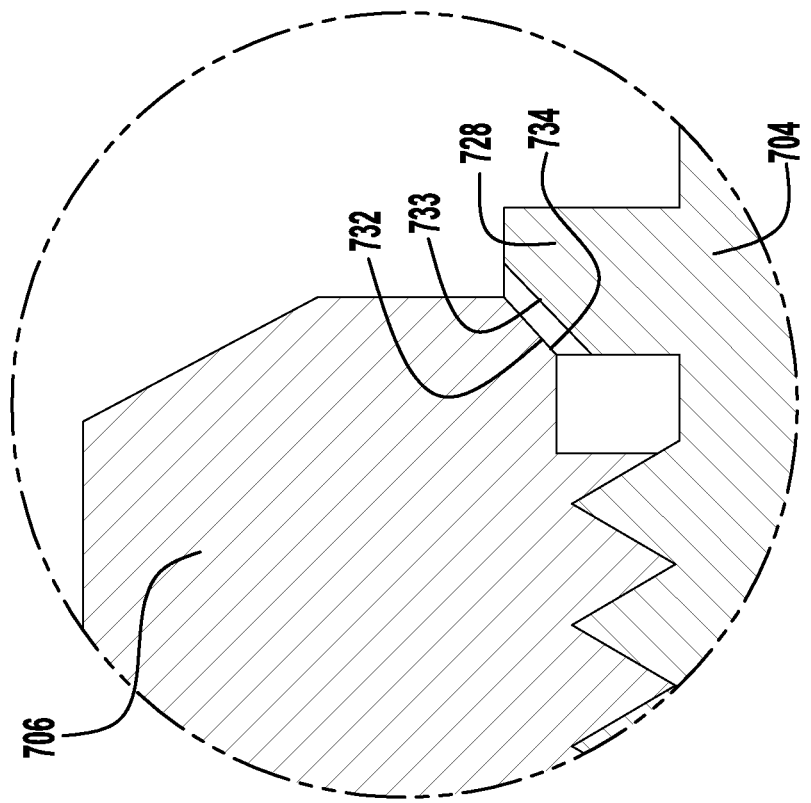
FIG. 22 is an enlarged illustration of the circled portion of FIG. 21.

In one embodiment, as best shown in FIG. 22, the stroke resisting surface 732 of the body flange 728 includes one or more radially extending recesses 733. In the illustrated embodiment, the recesses 733 are grooves formed (e.g., machined, embossed, or molded) in the stroke resisting surface 732. While the recesses 733 are shown as extending along lines intersecting the central axis X of the fitting 700, in other embodiments, the radially extending recesses may extend partially circumferentially or tangentially across the annular stroke resisting surface 732 (e.g., spiral curved recesses, recesses angled with respect to a radial orientation, cross-hatched or knurled recesses, or zigzagged recesses), with the recesses extending from an inner diameter of the annular surface (i.e., an inner edge of the surface 732 in contact with the contacting surface 734 of the nut 706) to an outer diameter of the annular surface (i.e., an outer edge of the surface 732 in contact with the contacting surface 734 of the nut 706) to maintain a leak detection port. Note that as described herein, the contacting surface 734 of the nut 706 need not extend across the entire inner chamfered surface of the body.

The radially extending recesses 733 may be sized and oriented to provide leak detection ports for the fitting 700 when the nut 706 and body 704 are pulled up to the first relative axial position, such that fitting leakage (e.g., leakage past the ferrules 708, 710 into the normally non-wetted interior volume of the fitting 700) may be detected at the leak detection ports, for example, by use of an electronic leak detection probe or application of a leak detection fluid. As such, the recesses 733 may be sized for visual identification by the user (e.g., a maximum width of about 0.004" to about 0.030", or about 0.010", and a depth of about 0.004" to about 0.030", or about 0.010"), and may be oriented to ensure ease of access by a user (e.g., 4-6 recesses evenly spaced around the circumference of the body flange 728). Other sizes, shapes, and numbers of recesses (e.g., 1-8 recesses) may additionally or alternatively be utilized. In the illustrated embodiment, the recesses 733 may have a V-notch cross-sectional shape. In other exemplary embodiments, cross-sectional shapes of the recess grooves may include, for example, buttress or half V-notch, radius tipped V-notch, semicircular, semielliptical, rectangular, trapezoidal, or a combination of these shapes.

In another embodiment, radially extending recesses may additionally or alternatively be provided in the annular contacting surface of the fitting nut that contacts the stroke resisting surface of the body flange. As shown in the enlarged partial view of FIG. 22A, in an alternative embodiment, an annular contacting surface 734a of the nut 706a includes a plurality of radially extending recesses 733a. In the illustrated embodiment, the recesses 733a are grooves formed (e.g., machined, embossed, or molded) in the annular surface. While the recesses 733a are shown as extending along lines intersecting the central axis X of the fitting 700a, in other embodiments, the radially extending recesses may extend partially circumferentially or tangentially across the annular contacting surface 734a (e.g., spiral curved recesses, recesses angled with respect to a radial orientation, cross-hatched or knurled recesses, or zigzagged recesses), with the recesses extending from an inner diameter of the annular surface (i.e., an inner edge of the surface 734a in contact with the stroke resisting surface 732a of the body flange 728a) to an outer diameter of the annular surface (i.e., an outer edge of the surface 734a in contact with the stroke resisting surface 732a of the body flange 728a) to maintain a leak detection port. Note that as described herein, the stroke resisting surface 732a of the body flange 728a need not extend across the entire outer chamfered surface of the nut flange. Similar to the recesses 733 of FIG. 21, the radially extending recesses 733a may be sized and oriented to provide leak detection ports for the fitting when the nut 706a and body 704a are pulled up to the first relative axial position, such that fitting leakage may be detected at the leak detection ports, for example, by use of an electronic leak detection probe or application of a leak detection fluid.

In still other exemplary embodiments (not shown), a radially extending, axially flexible flange defining an annular stroke resisting surface is assembled with (e.g., threaded or split/snap ring installation) one of the first and second fitting components (e.g., a threaded fitting body or a threaded fitting nut), and an annular contacting surface is disposed on the other of the first and second fitting components (e.g., a threaded fitting nut or a threaded fitting body), with leak detection port defining recesses disposed on the stroke resisting surface and/or the contacting surface. Examples of such flexible flange arrangements are described in the above incorporated '878 Application (see FIGS. 15A-17 of the '878 Application).

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A fitting for conduits having a central axis, comprising:
   a first threaded fitting component;
   a conduit gripping device receivable within the first threaded fitting component;
   a second threaded fitting component that threadably joins with the first threaded fitting component to produce relative axial stroke between the first threaded fitting component and the second threaded fitting component, wherein when the fitting is pulled-up on a conduit the first fitting component and the second fitting component can be joined together to a first relative axial position of the first and second fitting components to effect conduit grip and seal by the conduit gripping device, sealing the conduit from a non-wetted fitting interior volume at least partially defined by the first and second threaded fitting components; and
   a stroke resisting member having a ring shaped portion defining a first annular surface that axially engages a second annular surface of the fitting when the first fitting component and the second fitting component are joined together to the first relative axial position, the stroke resisting member resisting additional axial stroke of the first and second fitting components, such that a tightening torque beyond the first relative axial position is increased by the axial engagement of the first and second annular surfaces;

wherein at least one of the first annular surface and the second annular surface includes a groove extending from an inner diameter to an outer diameter of the corresponding annular surface, the groove defining a leak detection port in fluid communication with the fitting interior volume when the first annular surface is in axial engagement with the second annular surface;

wherein the stroke resisting member includes a deformable portion that is deformable to allow additional relative axial stroke between the first and second fitting components to a second relative axial position advanced beyond the first relative axial position.

2. The fitting of claim 1, wherein the stroke resisting member is integral with the first fitting component.

3. The fitting of claim 1, wherein the first annular surface includes the groove.

4. The fitting of claim 1, wherein the second annular surface is disposed on the second fitting component.

5. The fitting of claim 1, wherein the first and second annular surfaces extend substantially perpendicular to the central axis.

6. The fitting of claim 1, wherein the first and second annular surfaces are substantially parallel.

7. The fitting of claim 1, wherein the at least one of the first annular surface and the second annular surface includes a plurality of recesses that define a plurality of leak detection ports in fluid communication with the fitting interior volume.

8. The fitting of claim 1, wherein the first fitting component comprises a female threaded fitting nut and the second fitting component comprises a male threaded fitting body.

9. The fitting of claim 1, wherein the stroke resisting member includes an annular member connected with the deformable portion, the annular member defining the first annular surface.

10. The fitting of claim 9, wherein the annular member is integral with the deformable portion.

11. The fitting of claim 1, wherein the deformable portion has a first axial length when the first fitting component and the second fitting component are joined together to the first relative axial position, and wherein the deformable portion is compressed to a second axial length smaller than the first axial length when the first and second fitting components are pulled up to the second relative axial position.

12. The fitting of claim 1, wherein the stroke resisting member includes a ring portion having a first radial thickness, and the deformable portion includes a web portion having a second radial thickness smaller than the first radial thickness and configured to axially compress when the first and second fitting components are pulled up to the second relative axial position.

13. The fitting of claim 1, wherein the second relative axial position corresponds to a number of relative turns of the first and second fitting components past a finger tight position of the fitting in a remake subsequent to an initial pull-up of the fitting, sufficient to effect conduit grip and seal by the conduit gripping device.

14. The fitting of claim 1, wherein the first relative axial position corresponds to a predetermined number of relative turns of the first and second fitting components past a finger-tight position sufficient to effect conduit grip and seal by the conduit gripping device in an initial pull-up of the fitting.

15. The fitting of claim 1, wherein the first relative axial position corresponds to a predetermined number of relative turns of the first and second fitting components past a prescribed partially tightened condition used to fix the conduit gripping device to a conduit, the predetermined number of relative turns being sufficient to effect conduit grip and seal by the conduit gripping device.

16. The fitting of claim 1, wherein the first relative axial position may be identified by a first predetermined measured tightening torque during an initial pull-up of the first and second fitting components.

17. The fitting of claim 16, wherein the second relative axial position may be identified by a second predetermined measured tightening torque during a remake of the fitting subsequent to the initial pull-up of the first and second fitting components.

18. The fitting of claim 17, wherein the second measured tightening torque is substantially the same as the first measured tightening torque.

19. The fitting of claim 18, wherein a plastic compression of the stroke resisting member to the second axial length results in the second measured tightening torque being substantially the same as the first measured tightening torque.

20. The fitting of claim 1, wherein the groove extends substantially perpendicular to the central axis of the fitting.

21. The fitting of claim 1, wherein the groove extends along a line intersecting the central axis of the fitting.

22. A fitting for conduits having a central axis, comprising:
a first threaded fitting component;
a conduit gripping device receivable within the first threaded fitting component;
a second threaded fitting component that threadably joins with the first threaded fitting component to produce relative axial stroke between the first threaded fitting component and the second threaded fitting component, wherein when the fitting is pulled-up on a conduit the first fitting component and the second fitting component can be joined together to a first relative axial position of the first and second fitting components to effect conduit grip and seal by the conduit gripping device, sealing the conduit from a non-wetted fitting interior volume at least partially defined by the first and second threaded fitting components; and
a stroke resisting member having a first annular surface that axially engages a second annular surface of the fitting when the first fitting component and the second fitting component are joined together to the first relative axial position, the stroke resisting member resisting additional axial stroke of the first and second fitting components, such that a tightening torque beyond the first relative axial position is increased by the axial engagement of the first and second annular surfaces;
wherein at least one of the first annular surface and the second annular surface includes a recess extending from an inner diameter to an outer diameter of the corresponding annular surface, the recess defining a leak detection port in fluid communication with the fitting interior volume when the first annular surface is in axial engagement with the second annular surface;
wherein the stroke resisting member includes a deformable portion that is deformable to allow additional relative axial stroke between the first and second fitting components to a second relative axial position advanced beyond the first relative axial position;
wherein the stroke resisting member includes a ring portion having a first radial thickness, and the deformable portion includes a web portion having a second radial thickness smaller than the first radial thickness and configured to axially compress when the first and second fitting components are pulled up to the second relative axial position, wherein the first annular surface is disposed on the ring portion.

23. A stroke resisting member for a fitting, the stroke resisting member comprising:

an annular body having a central axis and comprising a proximal ring portion having a first radial thickness, a distal ring portion having a second radial thickness and defining an annular surface, a first wall portion having a third radial thickness smaller than the first radial thickness and extending axially from the proximal ring toward the distal ring, a second wall portion having a fourth radial thickness smaller than the second radial thickness and extending axially from the distal ring toward the proximal ring, and a web connecting the first and second wall portions, the web being angled with respect to each of the first and second wall portions to define a hinge portion; wherein the first annular surface includes a recess extending from an inner diameter to an outer diameter of the first annular surface, the recess defining a leak detection port in fluid communication with a fitting interior volume when the first annular surface is in axial engagement with a second annular surface of a fitting, when the stroke resisting member is assembled with the fitting and the fitting is pulled-up on a conduit end to effect conduit grip and seal by a conduit gripping device of the fitting.

* * * * *